United States Patent
Zou et al.

(10) Patent No.: US 6,214,429 B1
(45) Date of Patent: *Apr. 10, 2001

(54) DISC SUBSTRATES FOR INFORMATION RECORDING DISCS AND MAGNETIC DISCS

(75) Inventors: Xuelu Zou; Hisayoshi Toratani, both of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/222,869

(22) Filed: Dec. 30, 1998

Related U.S. Application Data

(63) Continuation-in-part of application No. 08/921,368, filed on Aug. 29, 1997, now abandoned.

(30) Foreign Application Priority Data

| Sep. 4, 1996 | (JP) | 8-233933 |
| Sep. 4, 1996 | (JP) | 8-233936 |
| Aug. 12, 1997 | (JP) | 9-217622 |

(51) Int. Cl.$^7$ .................................................. B32B 3/02
(52) U.S. Cl. .................. 428/64.1; 428/64.4; 428/426; 428/694 ST; 428/65.3; 428/913
(58) Field of Search ................. 428/64.1, 64.2, 428/64.4, 65.3, 694 ST, 694 SG, 913, 426; 501/11, 53, 55, 68, 69, 70

(56) References Cited

U.S. PATENT DOCUMENTS

| 3,804,646 | 4/1974 | Dumbaugh, Jr. . |
| 5,391,522 | 2/1995 | Goto et al. . |
| 5,476,821 | 12/1995 | Beall et al. . |
| 5,532,194 | 7/1996 | Kawashima et al. . |
| 5,561,089 | 10/1996 | Ishizaki et al. . |
| 5,846,628 | * 12/1998 | Kuroe ............................. 428/65.3 |
| 5,874,376 | * 12/1999 | Taguchi ............................. 501/63 |
| 5,997,977 | * 12/1999 | Zou ............................. 428/64.1 |

FOREIGN PATENT DOCUMENTS

| 0 634 374 A1 | 1/1995 | (EP) . |
| 1-239036 | 9/1989 | (JP) . |
| 3-273525 | 12/1991 | (JP) . |
| 7-187711 | 7/1995 | (JP) . |
| 7-247138 | 9/1995 | (JP) . |
| 8-169724 | 7/1996 | (JP) . |

OTHER PUBLICATIONS

Copy of International Search Report.

* cited by examiner

Primary Examiner—Elizabeth Evans
(74) Attorney, Agent, or Firm—Burns, Doane, Swecker & Mathis, L.L.P.

(57) ABSTRACT

Disclosed is disc substrate consisting of $SiO_2$—$Al_2O_3$—RO (RO=divalent metal) glasses having high specific elastic modulus of $36\times10^6$ Nm/kg or more or high Young's modulus of 110 GPa or more, high transition temperature of 700° C. or higher (high heat resistance), excellent surface smoothness (surface roughness Ra<5 Å) and high strength. The substrates exhibiting high specific elastic modulus or high Young's modulus and high strength enables to realize thinner magnetic discs and prevent breakdown of magnetic discs. Since glass substrates being composed of the glass have excellent heat resistance and flatness, the substrates can be subjected to heat treatment for improvement of magnetic layer characteristics and realize smaller flying height of magnetic head, i.e., higher recording density.

75 Claims, 1 Drawing Sheet

ABANDONED.

DISC SUBSTRATES FOR INFORMATION RECORDING DISCS AND MAGNETIC DISCS

This application is a CIP of Ser. No. 08/921,368 filed Aug. 29, 1997 abandoned.

BACKGROUND OF THE INVENTION

1. Field of the Invention

The present invention relates to glass disc substrates for information recording discs such as magnetic discs and optical discs. In particular, it relates to glass disc substrates for information recording disc, which exhibit high specific elastic modulus and/or Young's modulus and high heat resistance and realize excellent surface smoothness. In addition, the present invention relates to magnetic discs using the glass disc substrates of the present invention.

2. Description of the Related Art

Major components of magnetic storage devices of electronic computers and the like are a magnetic recording medium and a magnetic head for reconstruction of magnetically recorded information. Flexible discs and hard disks have been known as magnetic recording media. As substrates for hard discs (magnetic discs), for example, aluminum substrates, glass substrates, ceramic substrates, carbon substrates and the like have been known. In practical use, however, an aluminum substrate or a glass substrate is mainly used according to the intended size and the use thereof.

Recently, flying height of magnetic heads is markedly reduced as hard disc drivers for notebook personal computers are made smaller and their magnetic recording density made higher. Accordingly, extremely high precision has been demanded for the surface smoothness of magnetic disc substrates.

However, it is difficult to produce smooth surface more than a certain level of precision with an aluminum alloy. That is, even though it is polished by using highly precise abrasives and processing apparatuses, the polished surface may suffer from plastic deformation because of the low hardness of the alloy. Even if the aluminum alloy is plated with nickel-phosphorous, the surface roughness Ra cannot be made 20 Å (angstrom) or less. In addition, as hard disk drivers are made smaller and thinner, a further smaller thickness of substrates for magnetic discs is also strongly desired. However, it is difficult to produce such a thin disc with an aluminum alloy having a certain strength defined by specification of hard disk drivers because of low strength and stiffness of aluminum alloy.

Therefore, glass substrates for magnetic discs having high strength, high stiffness, high impact resistance and high surface smoothness have been developed. Because glass substrates have excellent surface smoothness and mechanical strength, they have been paid much attention as substrates for present and future use. For example, as such glass substrates, chemically tempered glass substrates whose surfaces are strengthened by the ion exchange technique, crystallized glass substrates subjected to crystallization treatment, alkali-free glass substrates which do not substantially contain alkaline substances and the like have been known well.

For example, as a chemically tempered glass substrate, Japanese Patent Unexamined Publication No. Hei 1-239036 (JP-A-239036/89) (referred to as Reference 1 hereinafter) discloses a glass substrate for magnetic recording media strengthened by subjecting to ion exchange treatment a glass material for the substrate containing, indicated in terms of % by weight, 60–70% of $SiO_2$, 0.5–14% of $Al_2O_3$, 10–32% of $R_2O$ where R is an alkali metal, 1–15% of ZnO and 1.1–14% of $B_2O_3$.

As a crystallized glass, Japanese Patent Unexamined Publication No. Hei 7-187711 (JP-A-187711/95) (referred to as Reference 2 hereinafter) discloses a glass substrate for magnetic recording media containing, indicated in terms of % by weight, 50–65% of $SiO_2$, 18–25% of CaO, 6–11% of $Na_2O$, 6–12% of $K_2O$, 0–2.5% of $Al_2O_3$ and 5–9% of F and containing kanasite as main crystals. U.S. Pat. No. 5,391, 522 (referred to as Reference 3 hereinafter) discloses a crystallized glass substrate for magnetic discs containing 65–83% of $SiO_2$, 8–13% of $Li_2O$, 0–7% of $K_2O$, 0.5–5.5% of MgO, 0–5% of ZnO, 0–5% of PbO, (provided that MgO+ZnO+PbO is 0.5–5%), 1–4% of $P_2O_5$, 0–7% of $Al_2O_3$ and 0–2% of $As_2O_3+Sb_2O_3$ and containing microcrystalline particles of $Li_2O.2\ SiO_2$ as main crystals.

As an alkali-free glass, Japanese Patent Unexamined Publication No. Hei 8-169724 (JP-A-169724/96) (referred to as Reference 4 hereinafter) discloses a glass substrate for magnetic discs having a composition containing, indicated in terms of % by weight, 35–55% of $SiO_2+Al_2O_3$, 0–10% of $B_2O_3$, 40–60% of CaO+BaO, provided that CaO$\geq$5%, 0–10% of ZnO+SrO+MgO, 0–5% of $TiO_2$, 0–5% of $ZrO_2$, 0–1% of $As_2O_3$ and/or $Sb_2O_3$.

Recent HDDs (hard disk drivers) have been required to have higher recording capacity to meet higher performance of personal computers, and a smaller and thinner disc substrate, smaller flying height of magnetic heads and higher revolution speed of discs have been required to meet smaller size and higher performance of personal computers. It is expected that the thickness of 2.5-inch diameter disc substrates should become thinner from the present thickness 0.635 mm to a thickness of 0.43 mm, or even 0.38 mm. In addition, for recent higher recording density of 3.5-inch hard discs for servers and higher data processing speed, requirement for stiffness of substrate materials becomes increasingly severer, and conventional aluminum substrates seem to almost reach their limits of performance. It is expected that further higher capacity and smaller size of hard discs will be sought in future. Therefore, smaller thickness, higher strength, more excellent surface smoothness, higher impact resistance and the like of substrates for magnetic recording media will be further strongly demanded.

However, as disc substrates become thinner, they become more likely to suffer deflexion and warp. On the other hand, as higher recording density is sought, lower flying height of magnetic heads and higher revolution speed of magnetic discs are further sought yet, and such deflexion and warp of substrates may cause breakdown of magnetic discs. However, if thickness of conventional glass substrates is made thinner than currently used, the problems due to the deflexion and warp mentioned above will become unacceptably marked and thus thinner discs cannot be realized.

Degree of deflexion and warp of substrates can be evaluated from specific elastic modulus (=Young's modulus/specific gravity) or Young's modulus of substrate material. Materials of higher specific elastic modulus are required for suppressing the problems of the deflexion and warp of substrates made with a smaller thickness. Further, materials of higher Young's modulus are required for suppressing the problems of the deflexion of substrates to be rotated at a high speed.

The above situation may be further explained as follows. That is, with recent smaller size, higher capacity and higher speed of HDDs, it is expected that the thickness of 3.5-inch discs currently used of 0.8 mm will be made smaller to 0.635 mm, and 0.635 mm of current 2.5-inch discs to 0.43 mm, or even to 0.38 mm. Revolution speed of substrates is also expected to be made faster from the current maximum speed of 7200 rpm to 10000 rpm, or even to 14000 rpm. As substrates for such magnetic recording media become thinner, they become more likely to suffer deflexion, undulation and warp, and it is expected that, as the revolution speed becomes higher, stress loaded on the substrates (force exerted by wind pressure caused by rotation of discs) will become larger. Based on the theory of dynamics, the deflexion W of a disc receiving load of P per unit area is represented by the following formula:

$$W \propto \frac{Pa^4}{h^3 E}$$

wherein a represents an outer diameter of disc, h represents a thickness of substrate and E represents Young's modulus of disc material.

In static state, force loaded on the disc is the gravitation alone is, and the deflexion W is represented by the following formula:

$$W \propto \frac{hda^4}{h^3 E} = \frac{da^4}{h^2 E} = \frac{a^4}{h^2 G}$$

wherein d represents a specific gravity of disc material and G is a specific elastic modulus of disc material (=Young's modulus/specific gravity).

On the other hand, supposing that the gravitational force is balanced by centrifugal force and can be ignored in rotating state of disc, force loaded on the disc may be considered only wind pressure caused by the rotation of the disc. The wind pressure is represented as a function of disc revolution speed and said to be proportional to the second power of the speed. Accordingly, the deflexion W when the disc is rotating is represented by the following formula:

$$w \propto \frac{(\text{rpm})^2 a^4}{h^3 E}$$

Therefore, in order to suppress the deflexion W of substrate to be rotated at a high speed, a material of high Young's modulus E is required. According to the present inventors' calculation, when the thickness of 2.5-inch substrate is made smaller from 0.635 mm to 0.43 mm, and the thickness of 3.5-inch substrate from 0.8 mm to 0.635 mm, a substrate material having a specific elastic modulus higher than that of conventional materials should be required. Further, when the current revolution speed of 3.5-inch high-end substrates of 7200 rpm is made faster to prospective 10000 rpm, an aluminum substrate having Young's modulus of around 70 GPa cannot meet such a high speed, and a new substrate material having a further higher Young's modulus should be required. As the specific elastic modulus or Young's modulus of substrate material becomes higher, not only stiffness of substrates becomes higher, but also impact resistance and strength of substrates become higher. Therefore, a glass material having high specific elastic modulus and high Young's modulus is strongly desired in the field of HDD production.

There are further properties of substrates for magnetic recording media required for realizing higher recording density other than the specific elastic modulus and Young's modulus. One of those is high heat resistance, and another is high surface smoothness. In order to obtain higher recording density of magnetic recording media, it is necessary to enhance magnetic characteristics such as magnetic coercive force of magnetic layer (magnetic recording layer). While coercive force of magnetic layer may vary depending on the kind of magnetic material used, coercive force of the magnetic material may be enhanced by heat-treatment even if the same material is used. Therefore, separating from development of new magnetic materials, it may be desirable to treat a magnetic layer formed on a substrate at a higher temperature in order to obtain higher coercive force using a conventional material. It is also possible to obtain higher recording density by making flying height of magnetic heads smaller. Therefore, the flying height of magnetic heads will be further made smaller in future. To realize smaller flying height of magnetic heads, good smoothness of disc surfaces and hence good smoothness of substrate surfaces are required.

The chemically tempered glass disclosed in Reference 1 has a glass transition point of around 500° C. However, to improve coercive force of magnetic layer, heat treatment at a temperature higher than 500° C. is effective. Accordingly, heat resistance of the chemically tempered glass of Reference 1 itself is insufficient. Chemically tempered glasses are generally made by providing an ion exchanged layer with alkali metal ions on surfaces of the glasses. However, when a magnetic layer is formed on the surface of a chemically tempered glass and heat-treated, the ions in the ion exchanged layer may disadvantageously migrate to the magnetic layer and adversely affect it. The migration of the alkali metal ions to the magnetic layer is more activated as the temperature becomes higher. To suppress the migration of alkali metal ions, heat treatment at a lower temperature is desirable. Thus, when chemically tempered glass substrates are used, it is difficult to improve magnetic characteristics by heat treatment at a high temperature and it is difficult to obtain magnetic recording media having high coercive force.

The above chemically tempered glass has a specific elastic modulus of about $30 \times 10^6$ Nm/kg and Young's modulus of about 80 GPa, and hence exhibits poor stiffness. Therefore, it cannot be used for 3.5-inch high-end disc substrates and thinner disc substrates. Moreover, chemically tempered glass substrates have stress layers on both surfaces, and these stress layers may cause deflexion when the stress layers do not have uniform and equivalent stress. Therefore, it is difficult to realize smaller flying height of magnetic heads and high-speed rotation with chemically tempered glass.

The conventional crystallized glasses such as those disclosed in References 2 and 3 exhibit excellent heat resistance because they do not show transition. However, glass substrates for magnetic recording media are required to have more excellent surface smoothness as higher recording density is attempted. This is because higher recording density of magnetic recording media requires a smaller flying height of magnetic heads. However, because crystallized glass contains many microparticles, they hardly afford substrates of a surface roughness (Ra) of 10 Å or less. As a result, substrates have poor surface smoothness and surface configuration of discs is degraded. An unevenness control layer, for example, is formed on substrates to prevent a magnetic head from being absorbed to magnetic discs. However, it is difficult to control surface homology of such an unevenness control layer provided on a substrate of crystallized glass.

The alkali-free glass disclosed in Reference 4 has a high transition temperature as high as 730° C. at most. However, it has a specific elastic modulus of only 27–34×10$^6$ Nm/kg and Young's modulus of around 70–90 GPa, and hence it can no way meet the demand of further thinner magnetic disc substrates.

As a substrate of excellent heat resistance, the carbon substrate disclosed in Japanese Patent Unexamined Publication No. Hei 3-273525 (JP-A-273525/91) (referred to as Reference 5 hereinafter) can be mentioned. However, the carbon substrate has a specific elastic modulus of around 15–19×10$^6$ Nm/kg and hence it is inferior to glass in mechanical strength. Therefore, it can hardly meet the demand for a thinner substrate required for the production of smaller magnetic discs. In addition, carbon substrates have many surface defects and hence it is difficult to realize higher recording density with them.

Thus, no oxide glass which has high specific elastic modulus or Young's modulus, exhibits high heat resistance and excellent surface smoothness (surface roughness $\leq 5$ Å) and can be produced in a large scale at low cost is currently found in the market. Even the $SiO_2$—$Al_2O_3$—MgO glasses, which is well known as commercially available oxide glass of high Young's modulus, have a Young's modulus of around 80–90 GPa at most.

Therefore, an object of the present invention is to provide a disc substrate consisting of a novel glass material satisfying high strength, high impact resistance, high specific elastic modulus, high heat resistance and high surface smoothness required for the production of smaller and thinner substrates for information recording media of higher recording density in future.

More specifically, the object of the present invention is to provide a disc substrate consisting of glass having a specific elastic modulus of 36×10$^6$ Nm/kg or more and glass transition temperature of 700° C. or higher, not containing microcrystalline particles, and exhibiting high surface smoothness (surface roughness Ra of 5 Å or less).

A further object of the present invention is to provide a disc substrate consisting of glass having a Young's modulus of 110 GPa or more, not containing microcrystalline particles, and exhibiting high surface smoothness (surface roughness Ra of 5 Å or less).

Degree of deflexion and warp of disc substrates can be estimated from specific elastic modulus (=Young's modulus/ specific gravity) of the material composing the substrate. In order to suppress deflexion and warp of thinner substrates to the extent that such problems do not occur, materials with higher specific elastic modulus are required. However, in a certain glass composition, effects added to specific elastic modulus by glass components have not been well known.

An object of the present invention is to provide a novel glass disc substrate exhibiting higher specific elastic modulus than those presently known by establishing theoretical relation between specific elastic modulus and glass composition, focussing on $SiO_2$—$Al_2O_3$—RO glasses (wherein R is a bivalent metal) which are preferred as substrates for information recording media such as magnetic discs, and investigating effects of glass components to specific elastic modulus.

A further object of the present invention is to provide magnetic discs using the above substrates.

SUMMARY OF THE INVENTION

Therefore, in order to provide glass disc substrates having a specific elastic modulus G of 36×10$^6$ Nm/kg or more or a Young's modulus of 110 GPa or more, the present inventors have designed novel glass compositions based on the theoretical calculation suggested by themselves and conducted various experiments and researches. As a result, it was found that novel glass which has a high Young's modulus not obtained so far, excellent surface smoothness and high heat resistance and producible in a large scale at a low cost can be obtained by using components greatly contributing to the improvement of Young's modulus such as $Al_2O_3$, $Y_2O_3$, MgO, $TiO_2$ and rare earth metal oxides in a large amount. In addition, with respect to $SiO_2$—$Al_2O_3$—RO glasses, new glass materials exhibiting higher specific elastic modulus than those presently known have been found. Based on this finding, the present invention has been completed.

In order to achieve the above objects, the present invention provides the following glass disc substrates of the present invention.

Disc substrates consisting of glass having a specific elastic modulus G of 36×10$^6$ Nm/kg or more (hereinafter referred to Glass disc substrate (1)).

Disc substrates consisting of glass containing, as oxides constituting the glass, $SiO_2$: 25–52%, $Al_2O_3$: 5–35%, MgO: 15–45%, $Y_2O_3$: 0–17%, $TiO_2$: 0–25%, $ZrO_2$: 0–8%, CaO: 1–30%, $B_2O_3+P_2O_5$: 0–5%, provided that $Y_2O_3+TiO_2+ZrO_2+CaO$: 5–30%, in molar %, and having a specific elastic modulus of 36×10$^6$ Nm/kg or more (hereinafter referred to Glass disc substrate (2)).

Disc substrates consisting of glass having a composition containing, as oxides constituting the glass, $SiO_2$: 25–50%, $Al_2O_3$: 10–37%, MgO: 5–40%, $TiO_2$: 1–25%, in molar %, and having a specific elastic modulus of 36×10$^6$ Nm/kg or more (hereinafter referred to Glass disc substrate (3)).

Disc substrates consisting of glass having a composition containing, as oxides constituting the glass, $SiO_2$: 25–50%, $Al_2O_3$: 20–40%, CaO: 8–30%, $Y_2O_3$: 2–15%, in molar %, and having a specific elastic modulus of 36×10$^6$ Nm/kg or more (hereinafter referred to Glass disc substrate (4)).

Disc substrates consisting of glass having a Young's modulus of 110 GPa or more (hereinafter referred to Glass disc substrate (5)).

Disc substrates consisting of glass having a composition containing, as oxides constituting the glass, $SiO_2$: 30–60%, $Al_2O_3$: 2–35%, MgO: 0–40%, $Li_2O$: 0–20%, $Y_2O_3$: 0–27%, $La_2O_3$: 0–27%, $CeO_2$: 0–27%, $Pr_2O_3$: 0–27%, $Nd_2O_3$: 0–27%, $Sm_2O_3$: 0–27%, $Eu_2O_3$: 0–27%, $Gd_2O_3$: 0–27%, $Tb_2O_3$: 0–27%, $Ho_2O_3$: 0–27%, $Er_2O_3$: 0–27%, $Tm_2O_3$: 0–27%, $Yb_2O_3$: 0–27%, provided that $Y_2O_3+La_2O_3+CeO_2+Pr_2O_3+Nd_2O_3+Sm_2O_3+Eu_2O_3+Gd_2O_3+Tb_2O_3+Dy_2O_3+Ho_2O_3+Er_2O_3+Tm_2O_3+Yb_2O_3$: 1–27% and $Li_2O+MgO+Y_2O_3+La_2O_3+CeO_2+Pr_2O_3+Nd_2O_3+Sm_2O_3+Eu_2O_3+Gd_2O_3+Tb_2O_3+Dy_2O_3+Ho_2O_3+Er_2O_3+Tm_2O_3+Yb_2O_3>25\%$, in molar %, and having a Young's modulus of 110 GPa or more (hereinafter referred to Glass disc substrate (6)).

Disc substrates consisting of glass composed of $SiO_2$—$Al_2O_3$—RO glass used for information recording media wherein R is a bivalent metal characterized in that said glass contains 20 molar % or more of $Al_2O_3$ (hereinafter referred to Glass disc substrate (7)).

Disc substrates consisting of glass composed of $SiO_2$—$Al_2O_3$—RO glass used for information recording media wherein R is a bivalent metal characterized in that said glass contains 20 molar % or more of MgO (hereinafter referred to Glass disc substrate (8)).

Disc substrates consisting of glass composed of $SiO_2$—$Al_2O_3$—RO glass used for information recording media wherein R is a bivalent metal characterized in that said glass further contains $Y_2O_3$ (hereinafter referred to Glass disc substrate (9)).

Disc substrates for information recording discs, wherein said substrates consist of glass mainly comprising $SiO_2$ as a network forming component and further comprising one or more oxide of metal selected from the group consisting of Ti, V, Cr, Mn, Fe, Co, Ni, Cu, Zn, Ga, Ge, Y, Zr, Nb, Mo, La, Ce, Pr, Nd, Pm, Sm, Eu, Gd, Tb, Dy, Ho, Er, Tm, Yb, Hf, Ta and W as Young's modulus modifiers in a range of 3–30 molar %(hereinafter referred to Glass disc substrate (10)).

Disc substrates for information recording discs, wherein the substrates consist of glass containing, as oxides constituting the glass, $SiO_2$: 30–60%, $Al_2O_3$: 2–35%, MgO: more than 0, equal to or than 40%, CaO: 0–15%, $TiO_2$: 2–20%, $Y_2O_3$: 1–27%, $ZrO_2$: 0–8% in molar %, and further containing an alkali metal oxide (hereinafter referred to Glass disc substrate (11)).

Disc substrates for information recording discs, wherein the substrates consist of glass containing, as oxides constituting the glass, $SiO_2$: 30–60%, $Al_2O_3$: 2–35%, MgO: 0–40%, CaO: 0–15%, $Y_2O_3$: 1–27%, $ZrO_2$: 0–8%, in molar %, and containing an alkali metal oxide, and wherein the glass is substantially free from $TiO_2$(hereinafter referred to Glass disc substrate (12)).

Disc substrates for information recording discs, wherein the substrates consist of glass containing, as oxides constituting the glass, $SiO_2$: 30–60%, $Al_2O_3$: 15–35%, MgO: 0–40%, CaO: 0–15%, $TiO_2$: 2–20%, $Y_2O_3$: 1–27%, $ZrO_2$: 0–8% in molar % and containing an alkali metal oxide (hereinafter referred to Glass disc substrate (13)).

Disc substrates for information recording discs, wherein the substrates consist of glass containing, as oxides constituting the glass, $SiO_2$: 30–60%, $Al_2O_3$: 2–35%, MgO: 0–40%, CaO: 0–15%, $TiO_2$: 2–20%, $Y_2O_3$: 1–27%, $ZrO_2$: 0–8% in molar %, and wherein the glass is substantially free from alkali metal oxides(hereinafter referred to Glass disc substrate (14)).

Magnetic discs comprising any of the above substrates (1) to (14) and at least one of magnetic layer thereon.

DESCRIPTION OF THE PREFERRED EMBODIMENTS

Figure 1:
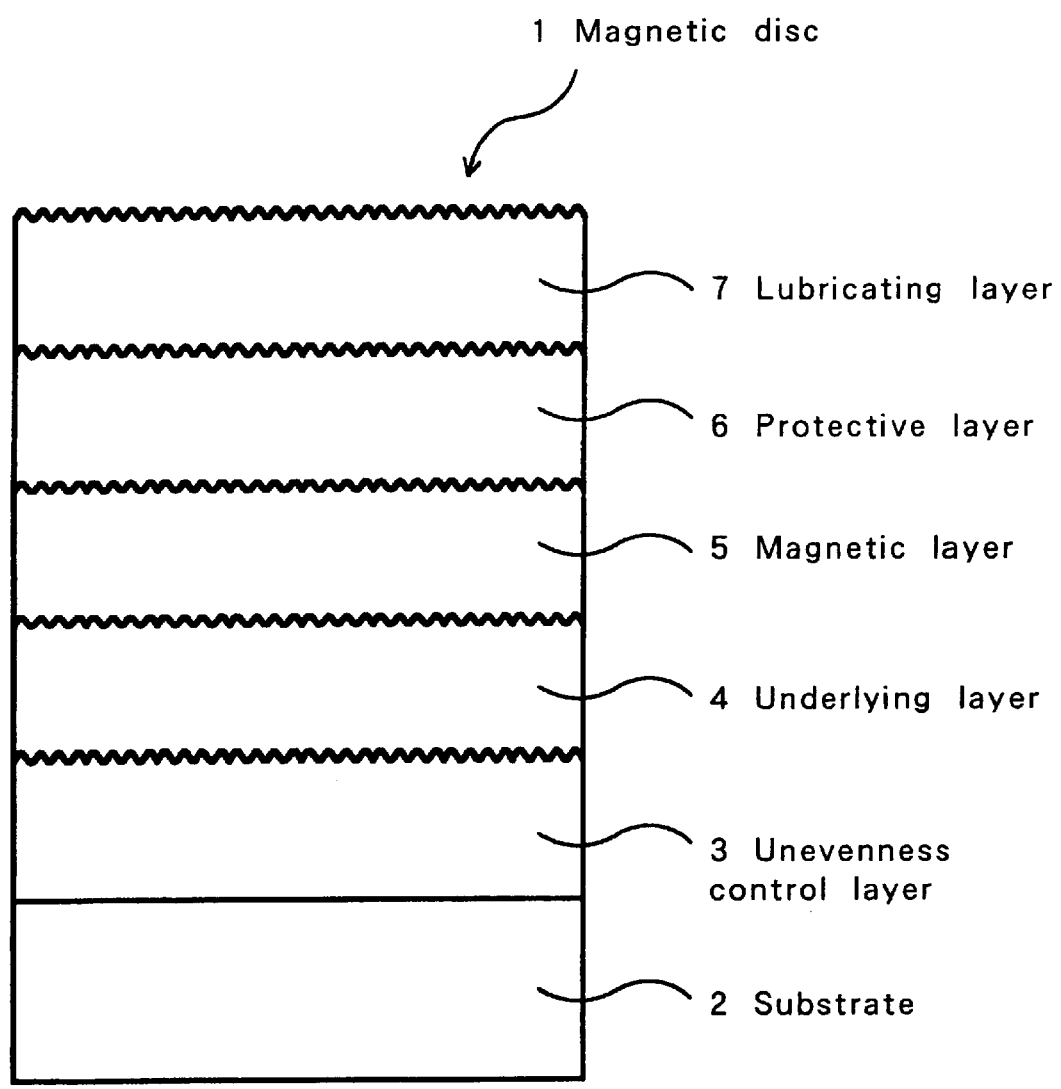
FIG. 1 is a schematic cross-sectional view of a magnetic disc 1 comprising a glass substrate 2, on which an unevenness control layer 3, underlying layer 4, magnetic layer 5, protective layer 6 and lubricating layer 7 are provided in this order.

The present invention will be further explained hereinafter.

The term "glass" used in the present invention means glass which does not substantially contain crystal grains, and does not mean those called as crystallized glass or glass ceramics.

Glass disc substrate(1)

Glass disc substrate (1) is characterized in that it has a specific elastic modulus G of $36 \times 10^6$ Nm/kg or more.

When the specific elastic modulus G is less than $36 \times 10^6$ Nm/kg, a substrate made of the glass exhibits severe deflexion, and, for example, a substrate of such glass having a thickness of 0.43 mm or less required for magnetic recording media discs of the next generation may exhibit a maximum deflexion of 1.4 μm or more. As a result, flying stability of magnetic heads cannot be obtained and hence reconstruction of recorded information cannot be performed stably. To obtain a substrate exhibiting a maximum deflexion of 1.25 μm or less, glass having a specific elastic modulus G of $37 \times 10^6$ Nm/kg or more is preferred. Glass having a specific elastic modulus of $42 \times 10^6$ Nm/kg or more is more preferred because such glass can afford a substrate which exhibits a maximum deflexion of 1.4 μm or less even if it is made as a substrate of a thickness of 0.38 mm or less to meet the demand of further thinner magnetic discs. While a specific elastic modulus as high as possible is preferred, practical value thereof is about $45 \times 10^6$ Nm/kg or less.

Glass disc substrate (1) consists of glass whose surface roughness (Ra) can be made 5 Å or less, in addition to having a specific elastic modulus G of $36 \times 10^6$ Nm/kg or more. Higher surface smoothness enables a smaller flying height of magnetic heads, which is required for higher density of magnetic discs. A surface roughness (Ra) of 5 Å or less can realize a flying height smaller than the conventional flying height. For realizing further higher density of magnetic discs, glass whose surface roughness (Ra) can be made 5 Å or less is preferred.

Glass disc substrate (1) consists of glass having a transition temperature of 700° C. or more, in addition to having a specific elastic modulus G of $36 \times 10^6$ Nm/kg or more and/or being possible to have surface roughness (Ra) of 5 Å or less. Because of a transition temperature of 700° C. or higher, heat resistance of substrate higher than that of the conventional one can be obtained, in addition to the reduced deflexion. Thus, a magnetic disc having improved magnetic characteristics such as coercive force can be provided.

As specific examples of glass disc substrate (1) having the above characteristics, glass disc substrates (2), (3) and (4) can be mentioned. These glass disc substrates are made of oxide glasses comprising cations having a small ionic radius, strong chemical bonding force and high packing density in the glass structure in order to satisfy the characteristics of glass disc substrate (1).

Glass disc substrate (2)

Glass disc substrate (2) has a composition constituted mainly for obtaining a high specific elastic modulus, and has a specific elastic modulus G of $36 \times 10^6$ Nm/kg or more. A glass having specific elastic modulus G of $36 \times 10^6$ Nm/kg or more can afford a substrate exhibiting reduced deflexion. For example, even when it is made into a substrate having a thickness of 0.43 mm or less required for magnetic recording media discs of the next generation, it may exhibit a maximum deflexion of 1.4 μm or less. As a result, excellent flying stability of magnetic heads can be obtained and hence reconstruction of recorded information can be performed stably. To obtain a substrate exhibiting a maximum deflexion of 1.25 μm or less, glass having a specific elastic modulus G of $37 \times 10^6$ Nm/kg or more is preferred. Glass having a specific elastic modulus of $42 \times 10^6$ Nm/kg or more is more preferred because such glass can afford a substrate which exhibits a maximum deflexion of 1.4 μm or less even if it is made into a substrate of a thickness of 0.38 mm or less to meet the demand of further thinner magnetic discs. While a specific elastic modulus as high as possible is preferred, practical value thereof is about $45 \times 10^6$ Nm/kg or less.

Glass (2) can have a surface roughness (Ra) of 5 Å or less. Higher surface smoothness enables a smaller flying height of magnetic heads, which is required for higher density of magnetic discs. A surface roughness (Ra) of 5 Å or less can realize a flying height smaller than the conventional flying height. For realizing further higher density of magnetic discs, a surface roughness (Ra) of 5 Å or less is preferred.

Glass disc substrate (2) consists of glass having a transition temperature of 700° C. or higher. Because of a transition temperature of 700° C. or higher, a substrate having heat resistance higher than that of the conventional one, in addition to the reduced deflexion, can be obtained. Thus, a magnetic disc having improved magnetic characteristics such as coercive force can be provided.

$SiO_2$ acts to form the network structure of glass and is a component for improving stability of glass structure, i.e., enhancing crystallization stability against devitrification. Further, $SiO_2$ in combination with an intermediate oxide such as $Al_2O_3$ can enhance mechanical properties of glass necessary for substrates for magnetic recording media such as strength and stiffness and also improve heat resistance of glass. However, oxide glass containing more than 52% of $SiO_2$ no longer exhibits a specific elastic modulus exceeding $36 \times 10^6$ Nm/kg, and therefore the content of $SiO_2$ is suitably 52% or less. On the other hand, a $SiO_2$ content less than 25% significantly degrades the crystallization stability of glass, and sufficiently stable glass suitable for large scale production cannot be obtained with such a content. Therefore, the lower limit of the $SiO_2$ content is 25%. Accordingly, the content of $SiO_2$ is suitably in the range of 25–52%, preferably in the range of 30–50%.

$Al_2O_3$ is very important as a component for imparting high heat resistance and high durability to glass and also as a component for enhancing stability of glass structure and stiffness together with $SiO_2$. In particular, when $Al_2O_3$ is introduced into glass to substitute $SiO_2$, $Al_2O_3$ enters into the skeletal structure of glass and markedly enhance Young's modulus and heat resistance of glass as a skeletal structure-forming component. That is, $Al_2O_3$ is a component essential for enhancing Young's modulus and improving heat resistance. However, a content of $Al_2O_3$ less than 5% cannot sufficiently improve Young's modulus of glass. When the content of $Al_2O_3$ exceeds 35%, MgO, which is a component contributing to improvement of specific elastic modulus of glass, cannot be introduced in a sufficient amount and hence melt characteristics of glass at a high temperature is also degraded. Therefore, the content of $Al_2O_3$ is suitably in the range of 5–35%, preferably in the range of 7–32%.

MgO is a component introduced for enhancing stiffness and strength of glass and improving melt characteristics of glass at a high temperature. It also contributes to improvement of crystallization stability and homogeneity of glass. In particular, when the content of $Al_2O_3$ is less than 20%, it is preferred to introduce a large amount of MgO in order to maintain high specific elastic modulus of glass. However, sufficiently stable glass suitable for large scale production cannot be obtained with a MgO content exceeding 45%. On the other hand, if the content of MgO is less than 15%, Young's modulus of glass tends to be lowered. Therefore, the content of MgO is suitably in the range of 15–45%, preferably in the range of 22–40%.

$Y_2O_3$ is a component introduced for enhancing crystallization stability of glass and improving durability and melt characteristics of glass at a high temperature. In particular, introduction of a small amount of $Y_2O_3$ markedly contributes to enhancement of specific elastic modulus of glass and improvement of glass homogeneity. However, while $Y_2O_3$ improves Young's modulus of glass, too much amount of $Y_2O_3$ steeply increases the specific gravity of glass and hence disadvantageously tends to degrade the specific elastic modulus of the glass. Therefore, the content of $Y_2O_3$ is suitably 17% or less, preferably 15% or less. To obtain distinct effects of the addition of $Y_2O_3$, the content of $Y_2O_3$ is preferably 0.5% or more.

$TiO_2$ acts as both of a glass skeletal structure-forming component and a modifying component. It lowers high temperature viscosity, improves melt characteristics of glass, enhances structure stability and improves durability. By introducing $TiO_2$ as a glass component, Young's modulus of glass can be markedly improved without significantly increasing specific gravity of glass. In particular, in glass containing large amounts of MgO, $Al_2O_3$ and the like, $TiO_2$ improves melt characteristics at a high temperature and crystallization stability of glass and is surely expected to enhance specific elastic modulus of glass in combination with other oxides such as MgO and $Al_2O_3$. However, when too much of $TiO_2$ is introduced, glass tends to show phase separation and hence disadvantageously degrade crystallization stability and homogeneity of glass. Therefore, the content of $TiO_2$ is suitably 25% or less, preferably 20% or less. To obtain distinct effects of the addition of $TiO_2$, the content of $TiO_2$ is preferably 1% or more.

CaO is a component introduced for enhancing stiffness and strength of glass and improving melt characteristics at a high temperature like MgO. CaO, like MgO, also contributes to improvement of crystallization stability of glass and homogeneity of glass. As described above, when the content of $Al_2O_3$ is less than 20%, it is preferred to introduce a large amount of MgO to maintain high specific elastic modulus of glass. In such a case, CaO is a component introduced mainly for improving melt characteristics at a high temperature and crystallization stability of glass. However, glass having crystallization stability suitable for large scale production cannot be obtained with a content of CaO exceeding 30%. Therefore, the content of CaO is suitably 30% or less, preferably 27% or less. In order to obtain distinct effects of the addition of CaO, the content of CaO is preferably 2% or more.

$ZrO_2$ is a component introduced mainly for enhancing durability and stiffness of glass Addition of $ZrO_2$ in a small amount improves heat resistance of glass and also enhances crystallization stability against devitrification. However, the content of $ZrO_2$ exceeds 8%, melt characteristics of glass at a high temperature is remarkably degraded, and surface smoothness of glass deteriorates and specific gravity increases. Therefore, the content of $ZrO_2$ is suitably 8% or less, preferably 6% or less. In order to obtain distinct effects of the addition of $ZrO_2$, the content of $ZrO_2$ is preferably 0.5% or more.

$Y_2O_3+TiO_2+ZrO_2+CaO$ is suitably in the range of 1–30%. These components are for contributing to enhancement of Young's modulus of glass and enhancement of crystallization stability. When the total amount of these components is less than 1%, Young's modulus of glass tends to be lowered and crystallization stability of glass tends to be degraded. On the other hand, these components increase specific gravity of glass, and hence introduction in a large amount may lower the specific elastic modulus of glass. Therefore, the total content of $Y_2O_3+TiO_2+ZrO_2+CaO$ is suitably in the range of 1–30%, preferably in the range of 5.5–27%.

$P_2O_5$ and $B_2O_3$ are components added for controlling melt characteristics of glass at a high temperature. For example, introduction of $P_2O_5$ and $B_2O_3$ in a small amount does not substantially affect on specific elastic modulus of glass but significantly lower high temperature viscosity of glass. Therefore, it is very effective for facilitating melting of glass. For improvement of melt characteristics of glass and control of crystallization stability and physical characteristics of glass, the total amount of $B_2O_3+P_2O_5$ is suitably 5% or less, preferably 3.5% or less. In order to obtain distinct effects of the addition of $B_2O_3$ and $P_2O_5$, the total content is preferably 0.5% or more.

$As_2O_3$ and $Sb_2O_3$ are components added as degassing agents in order to obtain homogenous glass. By adding $As_2O_3$ or $Sb_2O_3$ or both in a suitable amount selected depending on high temperature viscosity of glass, more homogenous glass can be obtained. However, if too much of the degassing agents is added, specific gravity of glass is increased and specific elastic modulus tends to be lowered. In addition, they may react with and damage a platinum crucible for melting. Therefore, the content is suitably 3% or less, preferably 2% or less. In order to obtain distinct effects of the addition of the degassing agent, the content is preferably 0.2% or more.

The other components such as $V_2O_5$, $Cr_2O_3$, ZnO, SrO, NiO, CoO, $Fe_2O_3$, CuO etc. may be added for controlling melt characteristics at a high temperature, physical properties and the like of glass. For example, by adding a small amount of a colorant such as $V_2O_5$, $Cr_2O_3$, CuO and COO to glass, infrared ray absorbing property can be imparted to the glass and heating treatment of magnetic layer by irradiating with a heat lamp can be effectively performed. For improving melt characteristics of glass and controlling crystallization stability and physical properties of glass, the total amount of $ZnO+SrO+NiO+CoO+FeO+CuO+Fe_2O_3+Cr_2O_3+B_2O_3+P_2O_5+V_2O_5$ is suitably 5% or less, preferably 4% or less.

Other than the components mentioned above, addition of $Fe_2O_3$ and the like and a clarifier for glass such as Cl, F and $SO_3$ in an amount of 1% or less does not substantially degrade the intended physical characteristics of the glass according to the present invention.

The above-mentioned glass is alkali-free glass which does not substantially contain alkali substances. Therefore, when a film is formed on a substrate made of this glass, any alkali substances do not migrate into the film and hence the film is not adversely affected.

Glass disc substrate (3)

Glass disc substrate (3) has a composition constituted mainly for obtaining a high specific elastic modulus, and the glasses have a specific elastic modulus G of $36 \times 10^6$ Nm/kg or more. Glass having specific elastic modulus G of $36 \times 10^6$ Nm/kg or more can afford a substrate exhibiting reduced deflexion. For example, even when it is made into a substrate having a thickness of 0.43 mm or less required for magnetic recording media discs of the next generation, it may exhibit a maximum deflexion of 1.4 $\mu$m or less. As a result, excellent flying stability of magnetic heads can be obtained and hence reconstruction of recorded information can be performed stably. To obtain a substrate exhibiting a maximum deflexion of 1.25 $\mu$m or less, glass having a specific elastic modulus G of $37 \times 10^6$ Nm/kg or more is preferred. Glass having a specific elastic modulus of $42 \times 10^6$ Nm/kg or more is more preferred because such glass can afford a substrate which exhibits a maximum deflexion of 1.4 $\mu$m or less even if it is made into substrate of a thickness of 0.38 mm or less to meet the demand of further thinner magnetic discs. While a specific elastic modulus as high as possible is preferred, practical value thereof is about $45 \times 10^6$ Nm/kg or less.

Glass disc substrate (3) can have a surface roughness (Ra) of 5 Å or less. Higher surface smoothness enables a smaller flying height of magnetic heads, which is required for higher density of magnetic discs. A surface roughness (Ra) of 5 Å or less can realize a flying height smaller than the conventional flying height. For realizing further higher density of magnetic discs, a surface roughness (Ra) of 5 Å or less is preferred.

Glass disc substrate (3) consists of glass having a transition temperature of 700° C. or higher. Because of a transition temperature of 700° C. or higher, a substrate having heat resistance higher than that of the conventional one, in addition to the reduced deflexion, can be obtained. Thus, a magnetic disc having improved magnetic characteristics such as coercive force can be provided.

$SiO_2$ acts as an oxide for forming the network structure of glass and is a component for improving stability of glass structure, i.e., enhancing crystallization stability against devitrification. Further, $SiO_2$ in combination with an intermediate oxide such as $Al_2O_3$ can enhance mechanical properties of glass necessary for substrates for magnetic recording media such as strength and stiffness and also improve heat resistance of glass. However, glass containing more than 50% of $SiO_2$ cannot contain a large amount of $Al_2O_3$ which is a component contributing to improvement of impact resistance and mechanical strength of glass. Therefore, in order to obtain glass having a high specific elastic modulus, the upper limit of the $SiO_2$ content is suitably 50%. On the other hand, a $SiO_2$ content less than 25% significantly degrades the crystallization stability of glass and sufficiently stable glass suitable for large scale production cannot be obtained with such a content. Therefore, the lower limit of the $SiO_2$ content is suitably 25%. Accordingly, the content of $SiO_2$ is suitably in the range of 25–50%, preferably in the range of 30–49%.

$Al_2O_3$ is very important as a component for imparting high heat resistance and high durability to glass and also as a component for enhancing stability of glass structure and stiffness together with $SiO_2$. In particular, when $Al_2O_3$ is introduced into glass to substitute $SiO_2$, $Al_2O_3$ enters into the skeletal structure of glass and markedly enhance Young's modulus and heat resistance of glass as a skeletal structure-forming component. That is, $Al_2O_3$ is a component essential for enhancing Young's modulus and improving heat resistance. However, when MgO is used with a content of 25% or less in order to further enhance flexural strength and impact resistance, a content of $Al_2O_3$ less than 10% cannot sufficiently improve Young's modulus of glass and hence a desired specific elastic modulus cannot be obtained. When the content of $Al_2O_3$ exceeds 37%, melt characteristics of glass at a high temperature is degraded, and hence homogenous glass cannot obtained and crystallization stability of glass is degraded. Therefore, the upper limit of the content of $Al_2O_3$ is suitably 37%. The content of $Al_2O_3$ is suitably in the range of 10–37%, preferably in the range of 11–35%.

MgO is a component introduced for enhancing stiffness and strength of glass and improving melt characteristics of glass at a high temperature. It also contributes to improvement of crystallization stability and homogeneity of glass. In particular, when $Al_2O_3$, which is a component for greatly improving Young's modulus of glass, is introduced in a large amount, MgO is preferably used for improving stability of glass structure as well as lowering melt characteristics at a high temperature to facilitate melting of glass. However, sufficiently stable glass suitable for large scale production containing a large amount of $Al_2O_3$ for enhancing impact resistance and strength of glass cannot be obtained with a MgO content exceeding 40%. On the other hand, with a content of MgO of less than 5%, glass exhibiting sufficient stability and high specific elastic modulus cannot be obtained. Therefore, the content of MgO is suitably in the range of 5–40%, preferably in the range of 7–35%.

$TiO_2$ acts as both of a glass skeletal structure-forming component and a modifying component. It lowers high temperature viscosity, improves melt characteristics of glass and enhances structure stability and durability. By introducing $TiO_2$ as a glass component, Young's modulus of glass can be markedly improved without significantly increasing specific gravity of glass. In particular, in glass containing a large amount of $Al_2O_3$, $TiO_2$ improves melt characteristics at a high temperature and crystallization stability of the glass and is surely expected to enhance specific elastic modulus of the glass in combination with $Al_2O_3$. However, when the content of $TiO_2$ exceeds 25%, glass tends to show phase separation and hence crystallization stability and homogeneity of glass tend to be disadvantageously degraded. On the other hand, addition of $TiO_2$ of 1% or more markedly improves melt characteristics of glass at a high temperature. Therefore, the content of $TiO_2$ is suitably in the range of 1–25%, preferably in the range of 2–20%.

$Y_2O_3$ is a component introduced for improving Young's modulus, enhancing crystallization stability of glass and improving durability and melt characteristics at a high temperature of glass. In particular, when a large amount of $Al_2O_3$ is introduced for enhancing flexural strength, impact resistance and the like, $Y_2O_3$ exerts excellent effect as a melting aid for $Al_2O_3$. For example, when $Al_2O_3$ of 25% or more is introduced into glass, homogenous glass can be obtained by adding $Y_2O_3$. However, since $Y_2O_3$ is relatively expensive, a smaller content is preferred from economical point of view. In addition, while a proper amount of $Y_2O_3$ greatly contributes to enhancement of specific elastic modulus of glass, when the content of $Y_2O_3$ exceeds 17%, increase of specific gravity overwhelms increase of Young's modulus of glass, and hence the addition can no longer contribute to improvement of specific elastic modulus of the glass. Therefore, the content of $Y_2O_3$ is suitably in the range of 0–17%, preferably in the range of 1–15% depending on the introduced amount of $Al_2O_3$.

CaO is a component capable of enhancing stiffness and strength of glass and improving melt characteristics of glass at a high temperature like MgO. CaO also contributes to improvement of crystallization stability of glass and homogeneity of glass. When a large amount of $Al_2O_3$ is introduced as a component greatly contributing to improvement of Young's modulus of glass, it is preferred to introduce MgO to improve stability of glass structure and to lower high temperature viscosity to facilitate melting. When the content of CaO exceeds 25%, glass containing a large amount of $Al_2O_3$ for enhancing impact resistance and strength of glass and having crystallization stability suitable for large scale production cannot be obtained. Therefore, the upper limit of the content of CaO is suitably 25%. In order to obtain distinct effects of the addition of CaO, the content of CaO is preferably 2% or more.

$ZrO_2$ is a component introduced mainly for enhancing durability and stiffness of glass. Addition of a small amount of $ZrO_2$ improves heat resistance of glass and also enhances crystallization stability against devitrification. However, when the content of $ZrO_2$ exceeds 8%, melt characteristics of glass at a high temperature is markedly degraded, and surface smoothness of glass deteriorates and specific gravity increases. Therefore, the content of $ZrO_2$ is suitably 8% or less, preferably 6% or less. In order to obtain distinct effects of the addition of $ZrO_2$, the content of $ZrO_2$ is preferably 0.5% or more.

$As_2O_3$ and $Sb_2O_3$ are components added as degassing agents in order to obtain homogenous glass. By adding $As_2O_3$ or $Sb_2O_3$ or both in a suitable amount selected depending on high temperature viscosity of glass, more homogenous glass can be obtained. However, if the amount of the degassing agents is too much, specific gravity of glass is increased and specific elastic modulus tends to be lowered. In addition, they may react with and damage a platinum crucible for melting. Therefore, the content is suitably 3% or less, preferably 2% or less. In order to obtain distinct effects of the addition of the degassing agent, the content is preferably 0.2% or more.

The other components such as $P_2O_5$, $V_2O_5$, $B_2O_3$, $Cr_2O_3$, ZnO, SrO, NiO, CoO, $Fe_2O_3$, CuO etc. may be added for controlling melt characteristics at a high temperature and physical properties and the like of glass. For example, addition of a small amount of $P_2O_5$ does not substantially affect specific elastic modulus of glass but significantly lower high temperature viscosity of glass, and hence it is effective for facilitating melting of glass. By adding a small amount of a colorant such as $V_2O_5$, $Cr_2O_3$, CuO and CoO to glass, infrared ray absorbing property can be imparted to the glass and heating treatment of magnetic layer by irradiation with a heat lamp can be effectively performed. For improving melt characteristics of glass at a high temperature and controlling physical and thermal properties of glass, the total amount of $ZnO+SrO+NiO+CoO+FeO+CuO+Cr_2O_3+B_2O_3+P_2O_5+V_2O_5$ is suitably 5% or less.

Other than the components mentioned above, addition of $Fe_2O_3$ and the like and a clarifier for glass such as Cl, F and $SO_3$ in an amount of 1% or less does not substantially degrade the intended physical characteristics of the glass according to the present invention.

When $Li_2O$ is contained in the glass, chemical tempering treatment by ion exchange can be performed to enhance strength of the glass. On the other hand, when the glass is alkali-free glass not containing $Li_2O$, any alkali substances do not migrate into a film formed on a substrate and hence the film is not adversely affected.

Glass disc substrate (4)

Glass disc substrate (4) has a composition constituted mainly for obtaining a high specific elastic modulus, and the glasses have a specific elastic modulus G of $36 \times 10^6$ Nm/kg or more. Glass having specific elastic modulus G of $36 \times 10^6$ Nm/kg or more can afford a substrate exhibiting reduced deflexion. For example, even when it is made into a substrate having a thickness of 0.43 mm or less required for magnetic recording media discs of the next generation, it exhibits a maximum deflexion of 1.4 μm or less. As a result, excellent flying stability of magnetic heads can be obtained and hence reconstruction of recorded information can be performed stably. To obtain a substrate exhibiting a maximum deflexion of 1.25 μm or less, glass having a specific elastic modulus G of $37 \times 10^6$ Nm/kg or more is preferred. Glass having a specific elastic modulus of $42 \times 10^6$ Nm/kg or more is more preferred because such glass can afford a substrate which exhibits a maximum deflexion of 1.4 μm or less even if it is made into a substrate of a thickness of 0.38 mm or less to meet the demand of further thinner magnetic discs. While a specific elastic modulus as high as possible is preferred, practical value thereof is about $45 \times 10^6$ Nm/kg or less.

Glass disc substrate (4) can have a surface roughness (Ra) of 5 Å or less. Higher surface smoothness enables a smaller flying height of magnetic heads, which is required for higher density of magnetic discs. A surface roughness (Ra) of 5 Å or less can realize a flying height smaller than the conventional flying height. For realizing further higher density of magnetic discs, a surface roughness (Ra) of 5 Å or less is preferred.

Glass disc substrate (4) consists of glass having a transition temperature of 700° C. or higher. Because of a transition temperature of 700° C. or higher, a substrate having heat resistance higher than that of the conventional one, in addition to the reduced deflexion, can be obtained. Thus, a magnetic disc having improved magnetic characteristics such as coercive force can be provided.

$SiO_2$ acts as an oxide for forming the network structure of glass and is a component for improving stability of glass structure, i.e., enhancing crystallization stability against devitrification. Further, $SiO_2$ in combination with an intermediate oxide such as $Al_2O_3$ can enhance mechanical properties of glass necessary for substrates for magnetic recording media such as strength and stiffness and also improve heat resistance of glass. However, oxide glass of $CaO$—$Al_2O_3$—$SiO_2$ system containing more than 50% of $SiO_2$ no longer exhibits a specific elastic modulus exceeding $36 \times 10^6$ Nm/kg, and therefore the content of $SiO_2$ is suitably 50% or less. On the other hand, a $SiO_2$ content less than 25% significantly degrades the crystallization stability of glass and sufficiently stable glass suitable for large scale production cannot be obtained with such a content. Therefore, the lower limit of the $SiO_2$ content is 25%. Accordingly, the content of $SiO_2$ is suitably in the range of 25–50%, preferably in the range of 30–50%.

$Al_2O_3$ is very important as a component for imparting high heat resistance and high durability and also as a component for enhancing stability of glass structure and stiffness together with $SiO_2$. In particular, when $Al_2O_3$ is introduced into glass to substitute $SiO_2$, $Al_2O_3$ enters into the skeletal structure of glass and markedly enhance Young's modulus and heat resistance of glass as a skeletal structure-forming component. That is, $Al_2O_3$ is a component essential for enhancing Young's modulus and improving heat resistance. A content of $Al_2O_3$ less than 20% cannot sufficiently improve Young's modulus of glass. On the other hand, when the content of $Al_2O_3$ exceeds 40%, melt characteristics of glass at a high temperature is degraded and hence homogenous glass cannot obtained, and crystallization stability of glass is also degraded. Therefore, the content of $Al_2O_3$ is suitably in the range of 20–40%, preferably in the range of 21–37%.

CaO is a component for enhancing stiffness and strength of glass and improving melt characteristics at a high temperature. It also contributes to improvement of crystallization stability of glass and homogeneity of glass. In particular, when a large amount of $Al_2O_3$ is introduced as a component greatly contributing to improvement of Young's modulus of glass, it is necessary to introduce CaO to improve stability of glass structure and to lower high temperature viscosity to facilitate melting of glass. However, when the content of CaO is less than 8%, crystallization stability of glass is markedly degraded. On the other hand, when the content of CaO exceeds 30%, Young's modulus of glass tends to be lowered. Therefore, the content of CaO is suitably in the range of 8–30%, preferably in the range of 10–27%.

$Y_2O_3$ is a component introduced for improving Young's modulus, enhancing crystallization stability of glass and improving durability and melt characteristics of glass at a high temperature. In particular, when a large amount of $Al_2O_3$ is introduced for enhancing Young's modulus of glass, $Y_2O_3$ exerts excellent effect as a melting aid for $Al_2O_3$. For example, when $Al_2O_3$ of 25% or more is introduced into glass, homogenous glass can be obtained by adding $Y_2O_3$ as a melting aid. However, since $Y_2O_3$ is relatively expensive, its content is preferably a relatively small amount, i.e., 15% or less depending on the properties required for glass. On the other hand, the content of $Y_2O_3$ is too small, melt characteristics of glass at a high temperature is degraded and specific elastic modulus of glass is lowered. Therefore, the lower limit of the content of $Y_2O_3$ is suitably 2%. Accordingly, the content of $Y_2O_3$ is suitably in the range of 2–15%, preferably in the range of 3–12%.

MgO is a component for enhancing stiffness and strength of glass and improving melt characteristics of glass at a high temperature. It also contributes to improvement of crystallization stability and homogeneity of glass, and improves specific elastic modulus. This component may optionally be added as desired. However, when the content of MgO exceeds 20%, the essential component, CaO, cannot be introduced in a large amount and thus crystallization stability tends to be lowered. Therefore, the upper limit of the content of MgO is suitably 20%. In order to obtain distinct effects of addition of MgO, its content is preferably 5% or more.

$TiO_2$ acts as both of a glass skeletal structure-forming component and a modifying component. It lowers high temperature viscosity, improves solubility of glass and enhances structure stability and durability. By introducing $TiO_2$ as a glass component, Young's modulus of glass can be markedly improved without significantly increasing specific gravity of glass. However, if too much amount of $TiO_2$ is introduced into $CaO$—$Al_2O_3$—$SiO_2$ system oxide glass, the glass tends to show phase separation and crystallization stability and homogeneity are disadvantageously degraded. Therefore, the content is suitably 25% or less, preferably 20% or less. In order to obtain distinct effects of addition of $TiO_2$, its content is preferably 1% or more.

$Li_2O$ is a component mainly for lowering high temperature viscosity of glass to facilitate melting. In particular, when the $Al_2O_3$ content is high, addition of small amount of $Li_2O$ is very effective for obtaining homogenous glass. However, if its content is too high, durability of glass is degraded and Young's modulus tends to be lowered. Therefore, the content of $Li_2O$ is suitably 15% or less, preferably 12% or less. In order to obtain distinct effects of the addition of $Li_2O$, the content of $Li_2O$ is preferably 1.5% or more.

$As_2O_3$ and $Sb_2O_3$ are components added as degassing agents in order to obtain homogenous glass. By adding $As_2O_3$ or $Sb_2O_3$ or both in a suitable amount selected depending on high temperature viscosity of glass, more homogenous glass can be obtained. However, if the amount of the degassing agents is too much, specific gravity of glass is increased and specific elastic modulus tends to be lowered. In addition, they may react with and damage a platinum crucible for melting. Therefore, the content is suitably 3% or less, preferably 2% or less. In order to obtain distinct effects of the addition of the degassing agent, the content is preferably 0.2% or more.

The other components such as $P_2O_5$, $V_2O_5$, $B_2O_3$, $Cr_2O_3$, ZnO, SrO, NiO, CoO, $Fe_2O_3$, CuO etc. may be added for controlling melt characteristics at a high temperature and physical properties and the like of glass. For example, addition of a small amount of $P_2O_5$ does not substantially affect specific elastic modulus of glass but significantly lower high temperature viscosity of glass and therefore melting of glass is facilitated. By adding a small amount of a colorant such as $V_2O_5$, $Cr_2O_3$, CuO and CoO to glass, infrared ray absorbing property can be imparted to the glass and heating treatment of magnetic layer by irradiation with a heat lamp can be effectively performed. For controlling physical and thermal properties of glass, the total amount of $ZnO+SrO+NiO+CoO+FeO+CuO+Fe_2O_3+Cr_2O_3+B_2O_3+P_2O_5+V_2O_5$ is suitably 5% or less.

Other than the components mentioned above, addition of $Fe_2O_3$ and the like and a clarifier for glass such as Cl, F and $SO_3$ in an amount of 1% or less does not substantially degrade the intended physical characteristics of the glass according to the present invention.

Glass disc substrate (5)

Glass disc substrate (5) of the present invention is characterized in that it consists of glass having a Young's modulus of 110 GPa or more.

If Young's modulus is less than 110 GPa, deflexion of substrate caused by wind pressure becomes severe when the substrate is rotated at a speed of 7200 rpm or more and stable head flying cannot be obtained, and hence reconstruction of recorded information cannot be performed stably. To obtain stable flying of heads, Young's modulus is preferably 120 GPa or more, particularly preferably 130 GPa or more. While Young's modulus as high as possible is desired, it is practically about 150 GPa or less.

Glass disc substrate (5) consists of glass whose surface roughness (Ra) can be made 5 Å or less, in addition to having a Young's modulus of 110 GPa or more. Higher surface smoothness enables a smaller flying height of magnetic heads, which is required for higher density of magnetic discs. A surface roughness (Ra) of 5 Å or less can realize a flying height smaller than the conventional flying height. For realizing further higher density of magnetic discs, glass whose surface roughness (Ra) can be made 5 Å or less is preferred.

Glass disc substrate (5) consists of glass having a transition temperature of 700° C. or higher, in addition to having a Young's modulus of 110 GPa or more and/or being possible to have surface roughness (Ra) of 5 Å or less. Because of a transition temperature of 700° C. or higher, a substrate having heat resistance higher than that of the conventional one can be obtained, in addition to having the reduced deflexion. Thus, a magnetic disc having improved magnetic characteristics such as coercive force can be provided.

As specific examples of glass disc substrate (5) having the above characteristics, glass disc substrate (6) can be mentioned. Glass disc substrate (6) is made of an oxide glass comprising cations having a small ionic radius, strong chemical bonding force and high packing density in the glass structure in order to satisfy the above characteristics.

Glass disc substrate (6)

$SiO_2$ acts as an oxide for forming the network structure of glass and is a component for improving stability of glass structure, i.e., enhancing crystallization stability against devitrification. Further, $SiO_2$ in combination with an intermediate oxide such as $Al_2O_3$ can enhance mechanical properties of glass necessary for substrates for magnetic recording media such as strength and stiffness and also improve heat resistance of glass. However, glass containing more than 60% of $SiO_2$ cannot contain a large amount of $Al_2O_3$, which is a component contributing to improvement of impact resistance and mechanical strength. Therefore, in order to obtain glass having a high Young's modulus, the $SiO_2$ content should be limited to 60% or less. On the other hand, if the $SiO_2$ content is too small, for example, less than 30%, crystallization stability of glass is significantly degraded and sufficiently stable glass suitable for large scale production cannot be obtained. Therefore, the content of $SiO_2$ is in the range of 30–60%, particularly preferably in the range of 32–55%.

$Al_2O_3$ is very important as a component for imparting high heat resistance and high durability to glass and also as a component for enhancing stability structure and stiffness of glass together with $SiO_2$. In particular, when $Al_2O_3$ is introduced into glass to substitute $SiO_2$, $Al_2O_3$ enters into the skeletal structure of glass and markedly enhance Young's modulus and heat resistance of glass as a skeletal structure-forming component. That is, $Al_2O_3$ is a component absolutely essential for enhancing Young's modulus and improving heat resistance. However, when $Y_2O_3$ is used with a content of 5% or less in order to further enhance flexural strength and impact resistance of glass, a content of $Al_2O_3$ less than 2% cannot sufficiently improve Young's modulus of glass. On the other hand, when the content of $Al_2O_3$ exceeds 35%, melt characteristics of glass at a high temperature is degraded, and hence homogenous glass cannot be obtained and crystallization stability of glass is degraded. Therefore, the content of $Al_2O_3$ is in the range of 2–35%. In particular, it is particularly preferably in the range of 3–30%.

MgO is a component introduced for enhancing stiffness and strength of glass and improving melt characteristics of glass at a high temperature. It also contributes to improvement of crystallization stability and homogeneity of glass. In particular, when $Al_2O_3$, which is a component for greatly improving Young's modulus of glass, is introduced in a large amount, MgO is very important for improving stability of glass structure as well as lowering melt characteristics at a high temperature to facilitate melting of glass. However, when the MgO content exceeds 40%, crystallization stability sufficient for large scale production cannot be obtained for glass containing a large amount of $Y_2O_3$ or $Al_2O_3$ for enhancing impact resistance and strength of glass. Therefore, the content of MgO is suitably in the range of 0–40%. In particular, the content of MgO is preferably in the range of 5–35%.

Rare earth metal oxides such as $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$ and $Yb_2O_3$ are components introduced for improving Young's modulus, enhancing crystallization stability, and improving durability and melt characteristics of glass at a high temperature. In particular, when a large amount of $Al_2O_3$ is introduced into glass for enhancing flexural strength and impact resistance of glass, the role of the rare earth metal oxides as a melting aid cannot be ignored. For example, when 20% or more of $Al_2O_3$ is introduced into glass, $Y_2O_3$ is an indispensable component for the production of homogeneous glass. However, because rare earth metal oxides are relatively expensive, they are preferably added in an amount as small as possible depending on the desired Young's modulus. If too much amount of rare earth metal oxide is added, while Young's modulus of glass increases, specific gravity also markedly increases. On the other hand, addition of rare earth metal oxide in a proper amount greatly contributes to improvement of Young's modulus of glass. Therefore, the total amount of rare earth metal oxides is suitably in the range of 1–27% depending the Young's modulus desired for glass used as magnetic disc substrates. In particular, the total content of the rare earth metal oxides is preferably in the range of 2–20%.

$Li_2O$ is a component very useful for improving melt characteristics of glass at a high temperature. In addition, addition of small amount of $Li_2O$ advantageously and markedly reduces specific gravity of glass without significantly changing Young's modulus of glass. Glass containing $Li_2O$ even in a small amount is advantageous for the production of high strength glass, because it can be chemically tempered by ion exchange. However, the content of $Li_2O$ is too high, crystallization stability of glass tends to be lowered. Therefore, the content of $Li_2O$ is suitably 15% or less. In order to obtain distinct effects of the addition of $Li_2O$, the content of $Li_2O$ is preferably 2% or more.

$TiO_2$ acts as both of a glass skeletal structure-forming component and a modifying component. It lowers high temperature viscosity, improves melt characteristics of glass and enhances structure stability and durability. By introducing $TiO_2$ as a glass component, Young's modulus of glass can be markedly improved without significantly increasing specific gravity of the glass. In particular, in glass containing a large amount of MgO or $Al_2O_3$, $TiO_2$ improves melt characteristics at a high temperature and crystallization stability of the glass and is surely expected to enhance specific elastic modulus of the glass in combination with $Al_2O_3$. However, too much amount of $TiO_2$ is introduced, glass tends to show phase separation and hence crystallization stability and homogeneity of glass are disadvantageously degraded. Therefore, the content of $TiO_2$ is suitably 20% or less. In particular, its content is preferably 15% or less. In order to obtain distinct effects of addition of $TiO_2$, its content is preferably 2% or more.

$ZrO_2$ is a component introduced mainly for enhancing durability and stiffness of glass. Addition of small amount of $ZrO_2$ improves heat resistance of glass and also enhances crystallization stability against devitrification. However, when the content of $ZrO_2$ exceeds 8%, melt characteristics of glass at a high temperature is markedly degraded, and surface smoothness of glass deteriorates and specific gravity increases. Therefore, the content of $ZrO_2$ is suitably 8% or less, preferably 6% or less. In order to obtain distinct effects of the addition of $ZrO_2$, the content of $ZrO_2$ is preferably 0.5% or more.

CaO, ZnO, NiO and $Fe_2O_3$ are components introduced mainly for improving melt characteristics at a high temperature and crystallization stability of glass. These components has a large cationic radius and effective for improving crystallization stability when introduced into glass together with MgO. However, if too much amount of them are introduced, specific gravity of glass increases and Young's modulus decreases. Therefore, the total content of CaO, ZnO, NiO and $Fe_2O_3$ is suitably 15% or less, preferably 12% or less. In order to obtain distinct effects of the addition of these components, the total content is preferably 1% or more.

$As_2O_3$ and $Sb_2O_3$ are components added as degassing agents in order to obtain homogenous glass. By adding $As_2O_3$ or $Sb_2O_3$ or both in a suitable amount selected depending on high temperature viscosity of glass, more homogenous glass can be obtained. However, if the amount of the degassing agents is too much, specific gravity of glass is increased and Young's modulus tends to be lowered. In addition, they may react with and damage a platinum crucible for melting. Therefore, the content of $As_2O_3+Sb_2O_3$ is preferably 2% or less, more preferably 1.5% or less.

The other components such as SrO, CoO, CuO, $Cr_2O_3$, $B_2O_3$, $P_2O_5$, $V_2O_5$, etc. may be added for controlling melt characteristics at a high temperature, physical properties and the like of glass. For example, addition of a small amount of $P_2O_5$ does not substantially affect specific elastic modulus of glass but significantly lower high temperature viscosity of glass and therefore melting of glass is facilitated. By adding a small amount of a colorant such as $V_2O_5$, $Cr_2O_3$, CuO and CoO to glass, infrared ray absorbing property can be imparted to the glass and heating treatment of magnetic layer by irradiation with a heat lamp can be effectively performed. For improving melt characteristics of glass at a high temperature and physical and thermal properties of glass, the total amount of $ZnO+SrO+NiO+CoO+FeO+CuO+Cr_2O_3+B_2O_3+P_2O_5+V_2O_5$ is suitably 5% or less.

Other than the basic components mentioned above, impurities including a clarifier for glass such as Cl, F and $SO_3$ in an amount of 1% or less does not substantially degrade the intended characteristics of the glass according to the present invention. Common items in Glass disc substrates (7)–(9)

In $SiO_2$—$Al_2O_3$—RO glasses of the present invention, $SiO_2$, one of major components of the glass, acts as an oxide for forming the network structure of glass and is a component for improving stability of glass structure. The $SiO_2$ content preferably ranges 25–55 molar %. If the $SiO_2$ content is less than 25 molar %, crystallization stability of glass is significantly degraded and sufficiently stable glass suitable for large scale production cannot be obtained. If the $SiO_2$ content exceeds 55 molar %, specific elastic modulus and Young's modulus of glass is significantly degraded. The $SiO_2$ content is more preferably in the range of 30–50 molar %.

Bivalent metal oxide represented by RO may be selected from MgO, CaO, ZnO, NiO and the like and does not limited to these oxides.

In order to improve specific elastic modulus and Young's modulus of glass, it is preferred to add at least one of $TiO_2$ and $ZrO_2$. The total content of these oxides is suitably more than 5 molar % in order to improve specific elastic modulus and Young's modulus of glass. $TiO_2$ enables to improve Young's modulus without increasing of specific gravity of glass. However, if too much of $TiO_2$ is introduced, glass tends to show phase separation and hence crystallization stability and homogeneity of glass are disadvantageously degraded. Therefore, the content of $TiO_2$ is suitably 25 molar % or less, preferably 20 molar % or less. The content of $ZrO_2$ is preferably 8 molar % or less. If the $ZrO_2$ content exceeds 8 molar %, melt characteristics of glass at a high temperature is markedly degraded, and surface smoothness of glass deteriorates and specific gravity increases. More preferably, the content of $ZrO_2$ is 6 molar % or less.

In order to improve melting properties, $LiO_2$ may be introduced. Since too much of $LiO_2$ tends to lower Young's modulus of glass, a small amount, for example 2 molar % or less, of $LiO_2$ is preferably introduced. It is possible to subject glasses containing $LiO_2$ to chemically strengthen treatment by ion exchange. When a film is formed on a substrate made of glass which do not contain $LiO_2$, any alkali substances do not migrate into the film and hence the film is not adversely affected.

In order to improve crystallization stability and the like, $B_2O_3$, $P_2O_5$, $V_2O_5$, $GeO_2$, $Ga_2O$, $HfO_2$, etc. may be added. $As_2O_3$ and $Sb_2O_3$ are components added as degassing agents in order to obtain homogenous glass.

$As_2O_3$ and/or $Sb_2O_3$ may be added as degassing agents in order to obtain homogenous glass. ZnO, SrO, NiO, CoO, $Fe_2O_3$, $CuOCr_2O_3$, $B_2O_3$, $P_2O_5$, $V_2O_5$ etc. may be added for controlling melt characteristics at a high temperature, physical properties and the like of glass. By adding a small amount of a colorant such as $V_2O_5$, $Cr_2O_3$, CuO and CoO to glass, infrared ray absorbing property can be imparted to the glass and heating treatment of magnetic layer by irradiation with a heat lamp can be effectively performed.

Glass disc substrate (7) Glass disc substrate (7) consists of glass containing 20 molar % or more of $Al_2O_3$. In $SiO_2$-$Al_2O_3$-RO glasses, glass with higher $Al_2O_3$ content exhibits higher specific elastic modulus. Glasses with 20 molar % or more of $Al_2O_3$ exhibit $38\times10^6$ Nm/kg or more of specific elastic modulus which are higher than that of conventional glass for information recording media. The upper limit of $Al_2O_3$ content is preferably 40 molar %. When the content of $Al_2O_3$ exceeds 40 molar %, melt characteristics of glass at a high temperature and crystallization stability would be degraded. When glass contains 20 molar % or more of $Al_2O_3$, it is suitable to introduce at least one selected from MgO and CaO as RO. When glass contains a lot of $Al_2O_3$, these components act to improve stability of glass structure and facilitate melting of glass by reducing glass viscosity at a high temperature. However, if too much amount of these components are added, crystallization stability maybe degraded. Therefore, the content of MgO+CaO is suitably in the range of 15–45 molar %.

Glass disc substrate (8)

Glass disc substrate (8) consists of glass containing 20 molar % or more of MgO. In $SiO_2$—$Al_2O_3$—RO glasses, glass with higher MgO content exhibits higher specific elastic modulus. Glasses with 20 molar % or more of MgO exhibit $38 \times 10^6$ Nm/kg or more of specific elastic modulus which are higher than that of conventional glass for information recording media. The upper limit of Mg content is preferably 45 molar %. When the content of MgO exceeds 45 molar %, crystallization stability may be degraded. The content of MgO preferably ranges 20–40 molar %.

When glass contains 20 molar % or more of MgO, it is suitable to introduce 5–40 molar % of $Al_2O_3$. If the content of $Al_2O_3$ is 5 molar % or less, crystallization stability may be degraded. If the content of $Al_2O_3$ exceeds 40 molar %, melt characteristics of glass at a high temperature and crystallization stability may be degraded.

CaO as RO may be added other than MgO. CaO act to improve melt characteristics of glass at a high temperature and crystallization stability. However, if too much of CaO is introduced, specific elastic modulus maybe lowered. Therefore, the content of CaO is preferably 27 molar % or less.

Glass disc substrate (9)

Glass disc substrate (9) further contains $Y_2O_3$. In $SiO_2$—$Al_2O_3$—RO glasses, specific elastic modulus can be improved by addition of $Y_2O_3$. The content of $Y_2O_3$ preferably ranges 0.5–17 molar %. $Y_2O_3$ is a component for enhancing Young's modulus and improving specific elastic modulus. However, a content of $Y_2O_3$ less than 0.5 molar % cannot sufficiently obtain the effects. On the other hand, when the content of $Y_2O_3$ exceeds 17 molar %, $Y_2O_3$ does not contribute to improvement of specific elastic modulus. In addition, a lower content of $Y_2O_3$ is preferred because it is expensive.

Effects of $Y_2O_3$ addition can be obtainable in $SiO_2$—$Al_2O_3$—RO glasses regardless of the contents of $Al_2O_3$ and MgO as RO, and $Y_2O_3$ can be added to the glasses of the present invention containing 20 molar % or more of $Al_2O_3$ or 20 molar % or more of MgO. In particular, addition of $Y_2O_3$ to glasses containing 20 molar % or more of $Al_2O_3$ is effective to improvement of specific elastic modulus and melt characteristics of glass at a high temperature.

Glass disc substrate (10)

Glass disc substrate (10) consists of glass mainly comprising $SiO_2$ as a network forming component and further comprising one or more oxide of metal selected from the group consisting of Ti, V, Cr, Mn, Fe, Co, Ni, Cu, Zn, Ga, Ge, Y, Zr, Nb, Mo, La, Ce, Pr, Nd, Pm, Sm, Eu, Gd, Tb, Dy, Ho, Er, Tm, Yb, Hf, Ta and W as Young's modulus modifiers in a range of 3–30 molar %.

It has been shown that an oxide of Y or Ti contributes to improve Young's modulus. Use of these substances are based on a theoretical idea of the present inventors that use of substances having high induction rate, which may increase glass filling density by introducing into glass, may increase Young's modulus of glass. In the same manner, by introducing metal oxides listed above which can increase glass filling density when they are introduced into glass in the range of 3–30 molar %, relatively high Young's modulus (e.g. 90 GPa or more) can be obtained. Such glass is highly suitable for substrate for information recording media such as magnetic discs. When the amount of said metal oxides introduced is less than 3 molar %, the increase of Young's modulus of glass is insufficient, and is not preferable. Also, when the amount of said metal oxides introduced is over 30 molar %, glass crystallization stability and homogeneity may be degraded, or specific gravity is largely increased while specific elastic modulus is decreased, wherein these changes differs depending on kinds of the metal. Therefore it is not preferred. The lower limit of amount of said oxides introduced is, with the consideration of increase of Young's modulus, preferably 5 molar %, more preferably 10 molar %. And, the upper limit of an amount of said metal oxides introduced, with a consideration of glass crystallization stability, homogeneity, and specific elastic modulus, is preferably 25 molar %, more preferably 20 molar %.

The content of $SiO_2$ is preferably in the range of 30–60%. In order to obtain glass having a high Young's modulus, the upper limit of the $SiO_2$ content is suitably 60%. On the other hand, a $SiO_2$ content less than 30% significantly degrades the crystallization stability of glass and sufficiently stable glass suitable for large scale production cannot be obtained with such a content.

The glass disc substrate (10) preferably consists of glass having a composition of $SiO_2$: 30–60%, $Al_2O_3$: 0–35%, MgO: 0–40%, CaO: 0–15%, $Li_2O$: 0–20%, $TiO_2$: 0–20%, $V_2O_5$: 0–8%, $Cr_2O_3$: 0–8%, MnO: 0–8%, $Fe_2O_3$: 0–15%, CoO: 0–8%, NiO: 0–15%, CuO: 0–8%, ZnO: 0–15%, $Ga_2O_3$: 0–8%, GeO: 0–8, $Y_2O_3$: 0–27%, $ZrO_2$: 0–8%, $Nb_2O_5$: 0–8%, $Mo_2O_3$: 0–8, $La_2O_3$: 0–27%, $CeO_2$: 0–27%, $Pr_2O_3$: 0–27%, $Nd_2O_3$: 0–27%, $Pm_2O_3$: 0–27, $Sm_2O_3$: 0–27%, $Eu_2O_3$: 0–27%, $Gd_2O_3$: 0–27%, $Tb_2O_3$: 0–27%, $Dy_2O_3$: 0–27%, $Ho_2O_3$: 0–27%, $Er_2O_3$: 0–27%, $Tm_2O_3$: 0–27%, $Yb_2O_3$: 0–27%, $HfO_2$: 0–8, $Ta_2O_5$: 0–8, WO: 0–8, provided that $TiO_2+V_2O_5+Cr_2O_3+MnO+Fe_2O_3+CoO+NiO+CuO+ZnO+Ga_2O_3+GeO+Y_2O_3+ZrO_2+Nb_2O_5+Mo_2O_3+La_2O_3+CeO_2+Pr_2O_3+Nd_2O_3+Sm_2O_3+Eu_2O_3+Gd_2O_3+Tb_2O_3+Dy_2O_3+Ho_2O_3+Er_2O_3+Tm_2O_3+Yb_2O_3$: 3–30% and $Li_2O+MgO+Y_2O_3+La_2O_3+CeO_2+Pr_2O_3+Nd_2O_3+Sm_2O_3+Eu_{2O3}+Gd_2O_3+Tb_2O_3+Dy_2O_3+Ho_2O_3+Er_2O_3+Tm_2O_3+Yb_2O_3 > 15\%$, in molar.

The glass disc substrate (10) preferably contains $Li_2O$. Glass containing $Li_2O$ even in a small amount is advantageous for the production of high strength glass, because it can be chemically tempered by ion exchange. However, the content of $Li_2O$ is too high, crystallization stability of glass tends to be lowered. Therefore, the content of $Li_2O$ is suitably in a range of 2–20%. In order to obtain distinct effects of the addition of $Li_2O$, the content of $Li_2O$ is preferably 2% or more. A $Li_2O$ content more than 20% degrades the crystallization stability of glass. The content of $Li_2O$ is preferably 15% or less.

The glass disc substrate (10) is preferably one has been chemically tempered by being subjected to ion-exchange of Li ions with Na ions.

Glass disc substrates (11)–(14)

$SiO_2$ acts as an oxide for forming the network structure of glass and is a component for improving stability of glass structure, i.e., enhancing crystallization stability against devitrification. Further, $SiO_2$ in combination with an intermediate oxide such as $Al_2O_3$ can enhance mechanical properties of glass necessary for substrates for magnetic recording media such as strength and stiffness and also improve heat resistance of glass. However, glass containing more than 60% of $SiO_2$ cannot contain a large amount of $Al_2O_3$, which is a component contributing to improvement of impact resistance and mechanical strength. Therefore, in order to obtain glass having a high Young's modulus, the $SiO_2$ content should be limited to 60% or less. On the other hand, if the $SiO_2$ content is too small, for example, less than 30%, crystallization stability of glass is significantly degraded and sufficiently stable glass suitable for large-scale production cannot be obtained. Therefore, the content of $SiO_2$ is in the range of 30–60%, particularly preferably in the range of 32–55%.

$Al_2O_3$ is very important as a component for imparting high heat resistance and high durability to glass and also as a component for enhancing stability structure and stiffness of glass together with $SiO_2$. In particular, when $Al_2O_3$ is introduced into glass to substitute $SiO_2$, $Al_2O_3$ enters into the skeletal structure of glass and markedly enhance Young's modulus and heat resistance of glass as a skeletal structure-forming component. That is, $Al_2O_3$ is a component absolutely essential for enhancing Young's modulus and improving heat resistance. However, when $Y_2O_3$ is used with a content of 5% or less in order to further enhance flexural strength and impact resistance of glass, a content of $Al_2O_3$ less than 2% cannot sufficiently improve Young's modulus of glass. On the other hand, when the content of $Al_2O_3$ exceeds 35%, melt characteristics of glass at a high temperature is degraded, and hence homogenous glass cannot be obtained and crystallization stability of glass is degraded. Therefore, the content of $Al_2O_3$ for substrates (11), (12) and (14) is in the range of 2–35%. In particular, it is particularly preferably in the range of 3–30%. The content of $Al_2O_3$ for substrate (13) is in the range of 15–35%.

MgO is a component introduced for enhancing stiffness and strength of glass and improving melt characteristics of glass at a high temperature. It also contributes to improvement of crystallization stability and homogeneity of glass. In particular, when $Al_2O_3$, which is a component for greatly improving Young's modulus of glass, is introduced in a large amount, MgO is very important for improving stability of glass structure as well as lowering melt characteristics at a high temperature to facilitate melting of glass. However, when the MgO content exceeds 40%, crystallization stability sufficient for large-scale production cannot be obtained for glass containing a large amount of $Y_2O_3$ or $Al_2O_3$ for enhancing impact resistance and strength of glass. Therefore, the content of MgO for substrates (12)–(14) is suitably in the range of 0–40%. Provided that the content of MgO for substrate (11) is suitably more than 0% and equal to or less than 40%. In particular, the content of MgO is preferably in the range of 5–35%.

$Y_2O_3$ is a component introduced for improving Young's modulus, enhancing crystallization stability, and improving durability and melt characteristics of glass at a high temperature. In particular, when a large amount of $Al_2O_3$ is introduced into glass for enhancing flexural strength and impact resistance of glass, the role of the rare earth metal oxides as a melting aid cannot be ignored. For example, when 20% or more of $Al_2O_3$ is introduced into glass, $Y_2O_3$ is an indispensable component for the production of homogeneous glass. However, because rare earth metal oxides are relatively expensive, they are preferably added in an amount as small as possible depending on the desired Young's modulus. If too much amount of rare earth metal oxide is added, while Young's modulus of glass increases, specific gravity also markedly increases. On the other hand, addition of $Y_2O_3$ in a proper amount greatly contributes to improvement of Young's modulus of glass. Therefore, the amount of $Y_2O_3$ is suitably in the range of 1–27% depending on the Young's modulus desired for glass used as magnetic disc substrates. In particular, the content of $Y_2O_3$ is preferably in the range of 2–20%.

An alkali metal oxide contained in substrates (11)–(13) preferably includes $Li_2O$. $Li_2O$ is a component very useful for improving melt characteristics of glass at a high temperature. In addition, addition of small amount of the alkali metal oxide such as $Li_2O$ advantageously and markedly reduces specific gravity of glass without significantly changing Young's modulus of glass. Glass containing $Li_2O$ even in a small amount is advantageous for the production of high strength glass, because it can be chemically tempered by ion exchange. However, the content of $Li_2O$ is too high, crystallization stability of glass tends to be lowered. Therefore, the content of $Li_2O$ is suitably 15% or less. In order to obtain distinct effects of the addition of $Li_2O$, the content of $Li_2O$ is preferably 2% or more. $Na_2O$ can also be included as an alkali metal oxide.

Provided that substrate (14) does not contain alkali metal oxides. Disc substrates not containing alkali metal oxides advantageously does not affect a thin layer such as a magnetic layer provided on the substrate. Because no alkali metal diffuses in the thin layer.

$TiO_2$ for substrates (11), (13) and (14) acts as both of a glass skeletal structure-forming component and a modifying component. It lowers high temperature viscosity, improves melt characteristics of glass and enhances structure stability and durability. By introducing $TiO_2$ as a glass component, Young's modulus of glass can be markedly improved without significantly increasing specific gravity of the glass. In particular, in glass containing a large amount of MgO or $Al_2O_3$, $TiO_2$ improves melt characteristics at a high temperature and crystallization stability of the glass and is surely expected to enhance specific elastic modulus of the glass in combination with $Al_2O_3$. However, too much amount of $TiO_2$ is introduced, glass tends to show phase separation and hence crystallization stability and homogeneity of glass are disadvantageously degraded. Therefore, the content of $TiO_2$ is suitably 20% or less. In particular, its content is preferably 15% or less. In order to obtain distinct effects of addition of $TiO_2$, its content is preferably 2% or more.

$ZrO_2$ is a component introduced mainly for enhancing durability and stiffness of glass. Addition of small amount of $ZrO_2$ improves heat resistance of glass and also enhances crystallization stability against devitrification. However, when the content of $ZrO_2$ exceeds 8%, melt characteristics of glass at a high temperature is markedly degraded, and surface smoothness of glass deteriorates and specific gravity increases. Therefore, the content of $ZrO_2$ is suitably 8% or less, preferably 6% or less. In order to obtain distinct effects of the addition of $ZrO_2$, the content of $ZrO_2$ is preferably 0.5% or more.

CaO is a component introduced mainly for improving melt characteristics at a high temperature and crystallization stability of glass. CaO has a large cationic radius and effective for improving crystallization stability when introduced into glass together with MgO. However, if too much amount of them are introduced, specific gravity of glass increases and Young's modulus decreases. Therefore, the content of CaO is suitably 15% or less, preferably 12% or less. In order to obtain distinct effects of the addition of these components, the content is preferably 1% or more.

$As_2O_3$ and $Sb_2O_3$ are components added as degassing agents in order to obtain homogenous glass. By adding $As_2O_3$ or $Sb_2O_3$ or both in a suitable amount selected depending on high temperature viscosity of glass, more homogenous glass can be obtained. However, if the amount of the degassing agents is too much, specific gravity of glass is increased and Young's modulus tends to be lowered. In addition, they may react with and damage a platinum crucible for melting. Therefore, the content of $As_2O_3+Sb_2O_3$ is preferably 2% or less, more preferably 1.5% or less.

The other components such as ZnO, NiO, $Fe_2O_3$, SrO, CoO, CuO, $Cr_2O_3$, $B_2O_3$, $P_2O_5$, $V_2O_5$, rare earth metal oxides other than $Y_2O_3$ etc. may be added for controlling melt characteristics at a high temperature, physical properties and the like of glass. For example, addition of a small amount of $P_2O_5$ does not substantially affect specific elastic modulus of glass but significantly lower high temperature viscosity of glass and therefore melting of glass is facilitated. By adding a small amount of a colorant such as $V_2O_5$, $Cr_2O_3$, CuO and CoO to glass, infrared ray absorbing property can be imparted to the glass and heating treatment of magnetic layer by irradiation with a heat lamp can be effectively performed. For improving melt characteristics of glass at a high temperature and physical and thermal properties of glass, the total amount of $ZnO+SrO+NiO+CoO+FeO+CuO+Cr_2O_3+B_2O_3+P_2O_5+V_2O_5$ is suitably 5% or less.

Other than the basic components mentioned above, impurities including a clarifier for glass such as Cl, F and $SO_3$ in an amount of 1% or less does not substantially degrade the intended characteristics of the glass according to the present invention.

Disc substrates for information recording discs

Examples of information recording disc for which disc Substrates (1)–(14) mentioned above are used include magnetic recording media, and examples of magnetic recording media includes magnetic discs such as hard discs. Size of the substrate can be selected in view of its use. The substrate of the present invention is characterized by exhibiting high surface smoothness. High surface smoothness means 5 Å or less, preferably 3–5 Å or less of surface roughness (Ra). Since distance between magnetic head and magnetic disc can be reduced by a magnetic disc using a substrate with high surface smoothness, higher recording density is obtainable.

Production method

The glass and the glass substrate of the present invention can be produced by a conventional production method. For example, glass materials of a given composition can be melted by the high temperature melting method, i.e., melted in air or inert gas atmosphere, homogenized by bubbling, addition of degassing agent, stirring or the like and molded into plate glass by well-known press method, down draw method or the like. Then, substrates for magnetic recording media of a desired size and shape can be obtained from the plate glass by processing such as cutting and polishing. In the polishing, surface roughness (Ra) of 5 Å, preferably 3–5 Å can be obtained by wrapping or polishing with polishing powder of cerium oxide or the like.

Because the glass of the present invention is excellent in the heat-resistance, surface smoothness, chemical resistance, optical properties and mechanical strength, it can be suitably used for substrates of information recording media such as magnetic discs, glass substrates for magneto optical discs, glass substrates for optoelectronics such as those for optical discs, heat resistant substrates for low temperature polycrystalline silicon liquid crystal display devices, which are expected as next generation LCD, substrates for various electric and electronic components or the like.

Magnetic disc

A magnetic disc (hard disk) comprising a substrate composed of the glass of the present invention described above and at least a magnetic layer formed on a main surface of the substrate will be explained hereinafter.

As layers other than the magnetic layer, underlying layer, protective layer, lubricating layer, unevenness control layer and the like are optionally formed depending on functions of the disc. These layers can be formed by various thin film-forming techniques.

Material for the magnetic layer is not particularly limited. For example, in addition to Co magnetic layers, ferrite magnetic layers, iron-rare earth metal magnetic layers and the like can be mentioned. The magnetic layer maybe either for horizontal magnetic recording or vertical magnetic recording.

Specific examples of the magnetic layer include, for example, those containing Co as a main component such as CoPt, CoCr, CoNi, CoNiCr, CoCrTa and CoPtCr, and CoNiCrPt, CoNiCrTa, CoCrPtTa, CoCrPtSiO and the like. The magnetic layer may be consisted of multiple layers comprising a non-magnetic layer for noise reduction separating magnetic layers.

The underlying layer of the magnetic layer may be selected depending on the nature of the magnetic layer. For example, the underlying layer may be those comprising one or more of non-magnetic metals such as Cr, Mo, Ta, Ti, W, V, B and Al, oxides, nitride, carbides and the like of those metals. For a magnetic layer comprising Co as the main component, an underlying layer of pure Cr or Cr alloy is preferred for improving magnetic characteristics. The underlying layer is not limited to a monolayer, and may be composed of multiple layers consisting of multiple identical or different layers. For example, the underlying layer may be a multi-layer underlying layer such as Al/Cr/CrMo and Al/Cr/Cr.

The unevenness control layer for preventing absorption of magnetic disc to magnetic head may be provided between the substrate and the magnetic layer or on the magnetic layer. Because surface roughness of the disc is properly controlled by the unevenness control layer, the magnetic disc is prevented from being absorbed to the magnetic disc and hence a highly reliable magnetic disc can be provided. Various materials and production methods for the unevenness control layer have been known and they are not particularly limited. For example, the material of the unevenness control layer may be one or more metals selected from Al, Ag, Ti, Nb, Ta, Bi, Si, Zr, Cr, Cu, Au, Sn, Pd, Sb, Ge, Mg and the like, alloys thereof, oxides, nitrides, carbides thereof and the like. For the ease of production, those produced from metals containing Al as a main component such as pure Al, Al alloys, Al oxides and Al nitrides are preferred.

For good head stiction, surface roughness of the unevenness forming layer is preferably Rmax of 50–300 Å, more preferably Rmax of 100–200 Å. When the Rmax is less than 50 Å, the disc surface is nearly flat, and hence the magnetic head and the disc are absorbed to each other. This may disadvantageously cause damage of the magnetic head and the magnetic disc, and head crash. On the other hand, when the Rmax exceeds 300 Å, glide height becomes larger and recording density is disadvantageously lowered.

Unevenness may be provided on the surface of the glass substrate by a texturing treatment such as etching treatment and irradiation of laser lights instead of providing the unevenness control layer.

The protective layer may be, for example, a Cr layer, Cr alloy layer, carbon layer, zirconia layer, silica layer or the like. These protective layers can be successively formed by an inline sputtering apparatus together with the underlying layer, the magnetic layer and the like. These protective layers may have either monolayer structure or multilayer structure comprising identical or different layers.

Another protective layer may be provided on or instead of the protective layer explained above. For example, a silicon oxide ($SiO_2$) layer may be formed on the protective layer mentioned above by applying tetraalkoxysilane diluted in an alcoholic solvent, in which colloidal silica is further dispersed, and sintering the applied layer. This layer functions as a protective layer and as an unevenness control layer.

While various kinds of layers have been proposed as the lubricating layer, it is generally formed by applying a liquid lubricating agent, perfluoropolyether, diluted in a solvent such as freons by dipping, spin coating, spraying or the like and subjecting the coated layer to a heat treatment as required.

Method for recording or reproducing

The present invention is also directed to a method for recording or reproducing of information in a magnetic layer of a magnetic disc using a flying magnetic head. In the present method, a magnetic disc of the present invention mentioned above is used. It is possible to achieve higher recording density by a smaller flying height of a magnetic head and a higher rotary speed of a magnetic disc. Because excellent flying stability of magnetic heads can be obtained due to high specific elastic modulus and Young's modulus of substrates (1)–(14) of the present invention.

EXAMPLES

The present invention will be further explained with reference to the following examples.

The glass compositions of Examples 1–61 which are examples of glass disc substrates (1)–(4) are shown in Tables 1–5 and the glass compositions of Examples 100–190 which are examples of glass disc substrates (5)–(6) are shown in Tables 6–13 in molar %. In addition, the glass compositions of Examples 200–209 which are examples of glass disc substrates (7)–(9) are shown in Tables 14 in molar %. Most of these examples are examples of glass disc substrates (10)–(14).

As the starting materials of these glasses, $SiO_2$, $Al_2O_3$, $Al(OH)_3$, $MgO$, $CaCO_3$, $Y_2O_3$, $TiO_2$, $ZrO_2$, $Li_2CO_3$ and the like were weighed into 250–300 g portions according to the given compositions shown in Tables 1–14 and mixed sufficiently to provide formulated batches. Each of them was charged in a platinum crucible and melted in air for 3 to 5 hours at 1550° C. After the melting, the glass melt was cast into a carbon mold having a size of 180×15×25 mm or φ67×5 mm, left to cool to the glass transition temperature, immediately transferred into an annealing furnace, annealed in the glass transition temperature range for about 1 hour and left to cool to room temperature in the furnace. The resulting glasses did not contain deposited crystals which can be observed by a microscope.

Glass pieces having a size of 180×15×25 mm were polished into pieces having a size of 100×10×10 mm or 10×10×20 mm and used as samples for measurements of Young's modulus, specific gravity and DSC. Glass discs of φ67×thickness of 5 mm were polished into discs of φ65× thickness of 0.5 mm and used as samples for measurement of surface roughness. The plate glass pieces of 10×1×20 mm were ground into 150 mesh powder, charged 50 mg of the resulting powder into a platinum pan and subjected to the DSC measurement using MAC-3300 DSC apparatus. The measurement of Young's modulus was achieved by the ultrasonic method using samples of 100×10×10 mm.

Values of surface roughness, specific gravity, Young's modulus, specific elastic modulus and transition temperature obtained in the measurements for the glasses of Examples 1–61 are shown in Tables 1–5 together with the glass compositions.

The obtained glasses were cut into discs and their main surfaces were polished with cerium oxide to afford magnetic disc substrates having a radius of outer circular periphery of 32.5 mm, radius of inner circular periphery of 10.0 mm and thickness of 0.43 mm. The results of deflexion measurement of the obtained discs are also shown in Tables 1–5.

Values of surface roughness, Young's modulus and transition temperature obtained in the measurements for the glasses of Examples 100–190 are shown in Tables 6–13 together with the glass compositions.

Values of surface roughness, specific gravity, Young's modulus and transition temperature obtained in the measurements for the glasses of Examples 200–209 are shown in Table 14 together with the glass compositions.

For comparison, compositions and characteristics of the ion exchanged glass substrate described in Japanese Patent Unexamined Publication No. Hei 1-239036 and the glass substrate described in Japanese Patent Unexamined Publication No. Hei 7-187711 are shown in Tables 5 and 13 as Comparative Examples 1 and 2.

TABLE 1

| | (molar %) | | | | | | | | | | | | |
|---|---|---|---|---|---|---|---|---|---|---|---|---|---|
| Example | 1 | 2 | 3 | 4 | 5 | 6 | 7 | 8 | 9 | 10 | 11 | 12 | 13 |
| $SiO_2$ | 49.00 | 45.00 | 44.00 | 45.00 | 40.00 | 45.00 | 45.00 | 34.00 | 30.00 | 35.00 | 35.00 | 35.00 | 40.00 |
| $Al_2O_3$ | 21.00 | 20.00 | 17.00 | 12.50 | 12.50 | 10.00 | 7.50 | 17.00 | 15.00 | 15.00 | 17.00 | 15.00 | 20.00 |
| MgO | 25.00 | 25.00 | 21.00 | 30.00 | 30.00 | 30.00 | 30.00 | 15.00 | 15.00 | 15.00 | 20.00 | 20.00 | 30.00 |
| CaO | 5.00 | 10.00 | 14.00 | 5.00 | 5.00 | 5.00 | 5.00 | 20.00 | 20.00 | 15.00 | 13.00 | 10.00 | — |
| $Y_2O_3$ | — | — | — | 7.50 | 7.50 | 5.00 | 7.50 | — | — | — | — | 5.00 | 5.00 |
| $TiO_2$ | — | — | 4.00 | — | 5.00 | 5.00 | — | 14.00 | 20.00 | 20.00 | 15.00 | 15.00 | 5.00 |
| $ZrO_2$ | — | — | — | — | — | — | 5.00 | — | — | — | — | — | — |
| $Li_2O$ | — | — | — | — | — | — | — | — | — | — | — | — | — |
| Surface roughness Ra (Å) | 3 | 4 | 4 | 4 | 4 | 4 | 5 | 4 | 5 | 5 | 4 | 4 | 4 |
| Specific gravity (g/cc) | 2.72 | 2.72 | 2.82 | 3.17 | 3.26 | 3.11 | 3.43 | 2.97 | 3.11 | 3.04 | 2.97 | 3.23 | 3.10 |
| Young's modulus | 108.8 | 107.4 | 108.4 | 119.9 | 125.1 | 118.9 | 126.8 | 113.5 | 119.5 | 120.0 | 116.5 | 123.9 | 124.5 |

TABLE 1-continued

| | | | | | | (molar %) | | | | | | | |
|---|---|---|---|---|---|---|---|---|---|---|---|---|---|
| Example | 1 | 2 | 3 | 4 | 5 | 6 | 7 | 8 | 9 | 10 | 11 | 12 | 13 |
| (GPa) | | | | | | | | | | | | | |
| Specific elastic modulus ($10^6$ Nm/kg) | 40 | 39.5 | 38.4 | 37.8 | 38.4 | 38.2 | 37.00 | 38.2 | 38.4 | 39.5 | 39.2 | 38.3 | 40.2 |
| Transition temperature (° C.) | 778 | 769 | 738 | 757 | 752 | 750 | 764 | 722 | 709 | 725 | 717 | 737 | 760 |
| h = 0.43 Deflexion (μm) | 1.18 | 1.19 | 1.22 | 1.23 | 1.20 | 1.22 | 1.26 | 1.22 | 1.21 | 1.19 | 1.20 | 1.21 | 1.16 |

TABLE 2

| | | | | | | (molar %) | | | | | | | |
|---|---|---|---|---|---|---|---|---|---|---|---|---|---|
| Example | 14 | 15 | 16 | 17 | 18 | 19 | 20 | 21 | 22 | 23 | 24 | 25 | 26 |
| $SiO_2$ | 40.00 | 35.00 | 40.00 | 45.00 | 50.00 | 35.00 | 40.00 | 40.00 | 40.00 | 40.00 | 35.00 | 40.00 | 45.00 |
| $Al_2O_3$ | 25.00 | 15.00 | 15.00 | 15.00 | 15.00 | 25.00 | 15.00 | 20.00 | 20.00 | 20.00 | 33.00 | 30.00 | 25.00 |
| MgO | 15.00 | 15.00 | 15.00 | 15.00 | 15.00 | 15.00 | 25.00 | 25.00 | 20.00 | 15.00 | 7.00 | 7.00 | 15.00 |
| CaO | 10.00 | 20.00 | 20.00 | — | 20.00 | 20.00 | 10.00 | 5.00 | 10.00 | 15.00 | 18.00 | 13.00 | 10.00 |
| $Y_2O_3$ | 5.00 | — | — | — | — | 5.00 | 5.00 | 5.00 | 5.00 | 5.00 | 5.00 | 5.00 | — |
| $TiO_2$ | 5.00 | 15.00 | 10.00 | 5.00 | — | 10.00 | 5.00 | 5.00 | 5.00 | 5.00 | 2.00 | 5.00 | 5.00 |
| $ZrO_2$ | — | — | — | — | — | — | — | — | — | — | — | — | — |
| $Li_2O$ | — | — | — | — | — | — | — | — | — | — | — | — | — |
| Surface roughness Ra (Å) | 4 | 5 | 4 | 4 | 4 | 5 | 4 | 4 | 4 | 4 | 4 | 5 | 4 |
| Specific gravity (g/cc) | 3.06 | 2.99 | 2.91 | 2.83 | 2.75 | 3.15 | 3.14 | 3.10 | 3.11 | 3.12 | 3.045 | 3.04 | 2.78 |
| Young's modulus (GPa) | 118.3 | 113.4 | 109.2 | 105.1 | 101.9 | 122.5 | 119.4 | 121.7 | 119.0 | 117.0 | 116.4 | 116.1 | 109.7 |
| Specific elastic modulus ($10^6$ Nm/kg) | 38.6 | 37.9 | 37.5 | 37.1 | 37.1 | 38.9 | 38.1 | 39.3 | 38.3 | 37.5 | 38.2 | 38.2 | 39.5 |
| Transition temperature (° C.) | 767 | 724 | 730 | 742 | 753 | 761 | 751 | 757 | 763 | 787 | 803 | 795 | 775 |
| h = 0.43 Deflexion (μm) | 1.21 | 1.23 | 1.25 | 1.27 | 1.27 | 1.20 | 1.22 | 1.18 | 1.22 | 1.24 | 1.22 | 1.23 | 1.19 |

TABLE 3

| | | | | | | (molar %) | | | | | | | |
|---|---|---|---|---|---|---|---|---|---|---|---|---|---|
| Example | 27 | 28 | 29 | 30 | 31 | 32 | 33 | 34 | 35 | 36 | 37 | 38 | 39 |
| $SiO_2$ | 45.00 | 45.00 | 42.00 | 43.00 | 45.00 | 41.00 | 40.00 | 40.00 | 35.00 | 40.00 | 37.00 | 36.00 | 36.50 |
| $Al_2O_3$ | 25.00 | 25.00 | 28.00 | 25.00 | 25.00 | 27.00 | 27.00 | 32.00 | 33.00 | 32.00 | 35.00 | 35.00 | 33.00 |
| MgO | 12.00 | 10.00 | 8.00 | 15.00 | 22.00 | 20.00 | 17.00 | 17.00 | — | — | — | — | — |
| CaO | 10.00 | 10.00 | 15.00 | 10.00 | — | — | — | — | 25.00 | 20.00 | 16.00 | 19.00 | 22.00 |
| $Y_2O_3$ | — | — | 3.50 | — | 1.00 | 4.00 | 8.00 | 8.00 | 5.00 | 8.00 | 5.00 | 5.00 | 4.00 |
| $TiO_2$ | 8.00 | 5.00 | 3.50 | 5.00 | 7.00 | 8.00 | 8.00 | 3.00 | 2.00 | — | — | — | 2.00 |
| $ZrO_2$ | — | — | — | 2.00 | — | — | — | — | — | — | — | — | — |
| $Li_2O$ | — | 5.00 | — | — | — | — | — | — | — | — | 7.00 | 5.00 | 2.50 |
| Surface roughness Ra (Å) | 5 | 4 | 3 | 4 | 3 | 4 | 4 | 4 | 4 | 4 | 5 | 4 | 4 |
| Specific gravity (g/cc) | 2.795 | 2.724 | 2.952 | 2.841 | 2.836 | 3.024 | 3.218 | 3.167 | 3.028 | 3.114 | 2.933 | 2.963 | 2.952 |
| Young's modulus (GPa) | 109.7 | 107.4 | 118.5 | 112.0 | 116.0 | 123.1 | 127.3 | 127.4 | 112.4 | 116.0 | 113.0 | 112.4 | 112.1 |
| Specific elastic modulus ($10^6$ Nm/kg) | 39.2 | 39.4 | 40.1 | 39.5 | 40.8 | 40.8 | 39.5 | 40.2 | 37.1 | 37.2 | 38.6 | 38.3 | 38.0 |
| Transition temperature (° C.) | 760 | 700 | 786 | 767 | 769 | 778 | 778 | 802 | 828 | 844 | 742 | 758 | 771 |
| h = 0.43 Deflexion (μm) | 1.20 | 1.20 | 1.17 | 1.19 | 1.15 | 1.15 | 1.18 | 1.16 | 1.26 | 1.25 | 1.22 | 1.23 | 1.24 |

TABLE 4

(molar %)

| Example | 40 | 41 | 42 | 43 | 44 | 45 | 46 | 47 | 48 | 49 | 50 | 51 | 52 |
|---|---|---|---|---|---|---|---|---|---|---|---|---|---|
| $SiO_2$ | 38.00 | 35.00 | 43.00 | 41.00 | 40.00 | 40.00 | 44.00 | 40.00 | 40.00 | 44.00 | 44.00 | 44.00 | 40.00 |
| $Al_2O_3$ | 32.00 | 37.00 | 30.00 | 30.00 | 25.00 | 30.00 | 25.00 | 15.00 | 12.50 | 20.00 | 15.00 | 10.00 | 15.00 |
| MgO | — | — | 17.00 | 18.00 | 25.00 | 20.00 | 25.00 | 30.00 | 30.00 | 30.00 | 35.00 | 40.00 | 35.00 |
| CaO | 15.00 | 10.00 | — | — | — | — | — | — | — | — | — | — | — |
| $Y_2O_3$ | 5.00 | 8.00 | 6.00 | 7.00 | 5.00 | 5.00 | 1.00 | 10.00 | 12.50 | 1.00 | 1.00 | 1.00 | 5.00 |
| $TiO_2$ | — | — | 4.00 | 4.00 | 5.00 | 5.00 | 5.00 | 5.00 | 5.00 | 5.00 | 5.00 | 5.00 | 5.00 |
| $ZrO_2$ | — | — | — | — | — | — | — | — | — | — | — | — | — |
| $Li_2O$ | 10.00 | 10.00 | — | — | — | — | — | — | — | — | — | — | — |
| Surface roughness Ra (Å) | 4 | 5 | 4 | 4 | 4 | 4 | 4 | 4 | 4 | 3 | 3 | 4 | 3 |
| Specific gravity (g/cc) | 2.905 | 3.022 | 3.071 | 3.14 | 3.063 | 3.057 | 2.833 | 3.386 | 3.515 | 2.85 | 2.87 | 2.89 | 3.119 |
| Young's modulus (GPa) | 111.4 | 115.5 | 124.3 | 128.9 | 124.1 | 124.2 | 117 | 129.8 | 131.9 | 116.3 | 116.0 | 116.1 | 123.8 |
| Specific elastic modulus ($10^6$ Nm/kg) | 38.3 | 38.2 | 40.5 | 41.1 | 40.5 | 40.6 | 41.3 | 38.3 | 37.5 | 40.8 | 40.6 | 40.2 | 39.7 |
| Transition temperature (° C.) | 710 | 727 | 791 | 799 | 778 | 785 | 768 | 773 | 778 | 758 | 743 | 736 | 751 |
| h = 0.43 Deflexion (μm) | 1.23 | 1.23 | 1.16 | 1.14 | 1.15 | 1.15 | 1.14 | 1.22 | 1.24 | 1.15 | 1.15 | 1.17 | 1.18 |

TABLE 5

(molar %)

| Example | 53 | 54 | 55 | 56 | 57 | 58 | 59 | 60 | 61 | Comparative 1 | Comparative 2 |
|---|---|---|---|---|---|---|---|---|---|---|---|
| $SiO_2$ | 40.00 | 40.00 | 40.00 | 40.00 | 35.00 | 43.00 | 40.00 | 40.00 | 45.00 | $SiO_2$: 73.0 | $SiO_2$: 52.0 |
| $Al_2O_3$ | 10.00 | 10.00 | 7.50 | 15.00 | 15.00 | 21.00 | 25.00 | 17.00 | 25.50 | $Al_2O_3$: 0.6 | $Al_2O_3$: 1.0 |
| MgO | 40.00 | 35.00 | 40.00 | 25.00 | 35.00 | 30.00 | 25.00 | 35.00 | 23.00 | CaO: 7.0 | CaO: 16.0 |
| CaO | — | — | — | — | — | — | — | — | — | $Na_2O$: 9.0 | $Na_2O$: 7.0 |
| $Y_2O_3$ | 5.00 | 10.00 | 7.50 | 15.00 | 5.00 | 1.00 | 5.00 | 3.00 | 3.00 | $K_2O$: 9.0 | $K_2O$: 5.0 |
| $TiO_2$ | 5.00 | 5.00 | 5.00 | 5.00 | 10.00 | — | — | — | 2.00 | ZnO: 2.0 | F: 19.0 |
| $ZrO_2$ | — | — | — | — | — | 5.00 | 5.00 | 5.00 | 2.00 | $As_2O_3$: 0.2 | — |
| $Li_2O$ | — | — | — | — | — | — | — | — | — | | |
| Surface roughness Ra (Å) | 4 | 3 | 4 | 4 | 5 | 4 | 5 | 4 | 4 | 12 | 25 |
| Specific gravity (g/cc) | 3.166 | 3.411 | 3.35 | 3.604 | 3.225 | 2.952 | 3.152 | 3.110 | 2.97 | 2.60 | 2.60 |
| Young's modulus (GPa) | 125.6 | 129.6 | 128.5 | 134.0 | 129.5 | 120.0 | 126.4 | 124.7 | 126.5 | 79.0 | 91.0 |
| Specific elastic modulus ($10^6$ Nm/kg) | 39.7 | 38.0 | 38.4 | 37.2 | 40.2 | 40.7 | 40.1 | 40.1 | 42.6 | 30.3 | 35.0 |
| Transition temperature (° C.) | 752 | 765 | 755 | 790 | 746 | 771 | 779 | 763 | 791 | 554 | — |
| h = 0.43 Deflexion (μm) | 1.18 | 1.22 | 1.21 | 1.25 | 1.16 | 1.15 | 1.17 | 1.16 | 1.09 | — | — |

TABLE 6

(molar %)

| Example | 100 | 101 | 102 | 103 | 104 | 105 | 106 | 107 | 108 | 109 | 110 | 111 | 112 |
|---|---|---|---|---|---|---|---|---|---|---|---|---|---|
| $SiO_2$ | 45.00 | 45.00 | 45.00 | 45.00 | 45.00 | 40.00 | 44.00 | 40.00 | 40.00 | 40.00 | 40.00 | 40.00 | 40.00 |
| $Al_2O_3$ | 12.50 | 12.50 | 12.00 | 18.00 | 22.00 | 25.00 | 15.00 | 15.00 | 17.50 | 20.00 | 22.50 | 20.00 | 15.00 | 17.50 |
| MgO | 30.00 | 26.00 | 28.00 | 22.00 | 18.00 | 20.00 | 25.00 | 25.00 | 22.50 | 20.00 | 17.50 | 22.00 | 27.00 | 27.50 |
| $Y_2O_3$ | 12.50 | 12.50 | 10.00 | 10.00 | 10.00 | 10.00 | 12.00 | 12.00 | 12.00 | 12.00 | 12.00 | 12.00 | 12.00 | 10.00 |
| $TiO_2$ | | 4.00 | | | | | 4.00 | | | | | | | |
| $ZrO_2$ | | | 5.00 | 5.00 | 5.00 | 5.00 | | 8.00 | 8.00 | 8.00 | 8.00 | 6.00 | 6.00 | 5.00 |

TABLE 6-continued (molar %)

| Example | 100 | 101 | 102 | 103 | 104 | 105 | 106 | 107 | 108 | 109 | 110 | 111 | 112 |
|---|---|---|---|---|---|---|---|---|---|---|---|---|---|
| $Li_2O$ | | | | | | | | | | | | | |
| CaO | | | | | | | | | | | | | |
| ZnO | | | | | | | | | | | | | |
| NiO | | | | | | | | | | | | | |
| $Fe_2O_3$ | | | | | | | | | | | | | |
| $R_2O_3$ | | | | | | | | | | | | | |
| Young's modulus (GPa) | 130.2 | 129.0 | 130.0 | 129.1 | 129.9 | 131.0 | 129.5 | 133.0 | 133.3 | 132.4 | 132.3 | 132.6 | 133.5 | 131.0 |
| Tg (° C.) | 790 | 773 | 794 | 771 | 812 | 806 | 784 | 773 | 778 | 775 | 795 | 783 | 773 | 773 |
| Surface roughness Ra (Å) | 4 | 3 | 4 | 4 | 4 | 4 | 3 | 3 | 4 | 3 | 4 | 4 | 4 | 4 |

TABLE 7

(molar %)

| Example | 114 | 115 | 116 | 117 | 118 | 119 | 120 | 121 | 122 | 123 | 124 | 125 | 126 |
|---|---|---|---|---|---|---|---|---|---|---|---|---|---|
| $SiO_2$ | 40.00 | 40.00 | 40.00 | 40.00 | 40.00 | 40.00 | 40.00 | 40.00 | 42.00 | 42.00 | 42.00 | 42.00 | 40.00 |
| $Al_2O_3$ | 22.50 | 25.00 | 25.00 | 20.00 | 15.00 | 15.00 | 20.00 | 25.00 | 25.00 | 20.00 | 15.00 | 20.00 | 22.50 |
| MgO | 22.50 | 20.00 | 17.50 | 22.50 | 27.50 | 25.00 | 20.00 | 15.00 | 18.00 | 23.00 | 25.00 | 20.00 | 22.50 |
| $Y_2O_3$ | 10.00 | 10.00 | 10.00 | 10.00 | 10.00 | 10.00 | 10.00 | 10.00 | 10.00 | 10.00 | 10.00 | 10.00 | 8.00 |
| $TiO_2$ | 5.00 | 5.00 | 7.50 | 7.50 | 7.50 | 10.00 | 10.00 | 10.00 | 5.00 | 5.00 | 8.00 | 8.00 | 7.00 |
| $ZrO_2$ | | | | | | | | | | | | | |
| $Li_2O$ | | | | | | | | | | | | | |
| CaO | | | | | | | | | | | | | |
| ZnO | | | | | | | | | | | | | |
| NiO | | | | | | | | | | | | | |
| $Fe_2O_3$ | | | | | | | | | | | | | |
| $R_2O_3$ | | | | | | | | | | | | | |
| Young's modulus (GPa) | 130.4 | 130.5 | 131.0 | 130.9 | 131.7 | 132.0 | 131.2 | 131.2 | 128.8 | 129.2 | 130.2 | 129.5 | 129.1 |
| Transition temperature (° C.) | 792 | 801 | 782 | 780 | 776 | 772 | 779 | 795 | 791 | 791 | 777 | 785 | 795 |
| Surface roughness Ra (Å) | 4 | 3 | 3 | 4 | 4 | 3 | 3 | 3 | 3 | 4 | 3 | 3 | 4 |

TABLE 8

(molar %)

| Example | 127 | 128 | 129 | 130 | 131 | 132 | 133 | 134 | 135 | 136 | 137 | 138 | 139 |
|---|---|---|---|---|---|---|---|---|---|---|---|---|---|
| $SiO_2$ | 40.00 | 40.00 | 40.00 | 45.00 | 50.00 | 45.00 | 50.00 | 42.00 | 42.00 | 40.00 | 42.00 | 42.00 | 42.00 |
| $Al_2O_3$ | 17.50 | 17.50 | 22.50 | 17.50 | 17.50 | 17.50 | 17.50 | 17.50 | 17.50 | 17.50 | 17.50 | 17.50 | 17.50 |
| MgO | 27.50 | 24.50 | 19.50 | 22.50 | 22.50 | 17.50 | 17.50 | 17.50 | 15.50 | 17.50 | 12.50 | 10.50 | 20.00 |
| $Y_2O_3$ | 8.00 | 8.00 | 8.00 | 10.00 | 10.00 | 10.00 | 10.00 | 10.00 | 12.00 | 10.00 | 10.00 | 12.00 | 10.00 |
| $TiO_2$ | 7.00 | 10.00 | 10.00 | 5.00 | | 5.00 | | 8.00 | 8.00 | 10.00 | 8.00 | 8.00 | 8.00 |
| $ZrO_2$ | | | | | | | | | | | | | |
| $Li_2O$ | | | | | | 5.00 | 5.00 | 5.00 | 5.00 | 5.00 | 10.00 | 10.00 | 2.50 |
| CaO | | | | | | | | | | | | | |
| ZnO | | | | | | | | | | | | | |
| NiO | | | | | | | | | | | | | |
| $Fe_2O_3$ | | | | | | | | | | | | | |
| $R_2O_3$ | | | | | | | | | | | | | |
| Young's modulus (GPa) | 129.6 | 129.7 | 129.5 | 127.1 | 122.2 | 125.9 | 121.5 | 128.6 | 130.5 | 130.3 | 124.1 | 125.8 | 130.4 |
| Transition temperature (° C.) | 790 | 760 | 782 | 778 | 782 | 704 | 716 | 716 | 710 | 706 | 657 | 652 | 727 |
| Surface roughness Ra (Å) | 4 | 3 | 4 | 2 | 2 | 3 | 2 | 3 | 3 | 3 | 3 | 4 | 3 |

TABLE 9

(molar %)

| Example | 140 | 141 | 142 | 143 | 144 | 145 | 146 | 147 | 148 | 149 | 150 | 151 | 152 |
|---|---|---|---|---|---|---|---|---|---|---|---|---|---|
| $SiO_2$ | 42.00 | 45.00 | 42.00 | 45.00 | 45.00 | 45.00 | 45.00 | 45.00 | 45.00 | 45.00 | 45.00 | 45.00 | 45.00 |
| $Al_2O_3$ | 17.50 | 15.50 | 17.50 | 23.00 | 23.00 | 23.00 | 23.00 | 23.00 | 23.00 | 28.00 | 18.00 | 13.00 | 8.00 |
| MgO | 18.50 | 17.50 | 20.50 | | 5.00 | 10.00 | 15.00 | 20.00 | 25.00 | | 10.00 | 20.00 | 25.00 | 30.00 |
| $Y_2O_3$ | 14.00 | 12.00 | 10.00 | 25.00 | 20.00 | 15.00 | 10.00 | 5.00 | | 10.00 | 10.00 | 10.00 | 10.00 |
| $TiO_2$ | 8.00 | 5.00 | 10.00 | 7.00 | 7.00 | 7.00 | 7.00 | 7.00 | 7.00 | 7.00 | 7.00 | 7.00 | 7.00 |
| $ZrO_2$ | | | | | | | | | | | | | |
| $Li_2O$ | | 5.00 | | | | | | | | | | | |
| CaO | | | | | | | | | | | | | |
| ZnO | | | | | | | | | | | | | |
| NiO | | | | | | | | | | | | | |
| $Fe_2O_3$ | | | | | | | | | | | | | |
| $R_2O_3$ | | | | | | | | | | | | | |
| Young's modulus (GPa) | 132.6 | 129.0 | 132.1 | 134.1 | 133.1 | 130.2 | 126.8 | 122.4 | 116 | 126.9 | 127 | 128.2 | 129.1 |
| Transition temperature (° C.) | 797 | 715 | 767 | 816 | 837 | 815 | 801 | 781 | 753 | 815 | 786 | 778 | 775 |
| Surface roughness Ra (Å) | 3 | 3 | 4 | 4 | 4 | 4 | 4 | 4 | 4 | 3 | 3 | 3 | 4 |

TABLE 10

(molar %)

| Example | 153 | 154 | 155 | 156 | 157 | 158 | 159 | 160 | 161 | 162 | 163 |
|---|---|---|---|---|---|---|---|---|---|---|---|
| $SiO_2$ | 45.00 | 45.00 | 45.00 | 45.00 | 38.00 | 38.00 | 38.00 | 40.00 | 38.00 | 38.00 | 38.00 |
| $Al_2O_3$ | 13.00 | 23.00 | 4.00 | 32.00 | 15.50 | 20.00 | 15.50 | 17.50 | 22.50 | 20.00 | 17.50 |
| MgO | 20.00 | 20.00 | 34.00 | 6.00 | 24.50 | 20.00 | 22.50 | 20.50 | 17.50 | 18.00 | 20.50 |
| $Y_2O_3$ | 15.00 | 5.00 | 10.00 | 10.00 | 12.00 | 12.00 | 12.00 | 10.00 | 12.00 | 12.00 | 12.00 |
| $TiO_2$ | 7.00 | 7.00 | 7.00 | 7.00 | 10.00 | 10.00 | 12.00 | 12.00 | 10.00 | 12.00 | 12.00 |
| $ZrO_2$ | | | | | | | | | | | |
| $Li_2O$ | | | | | | | | | | | |
| CaO | | | | | | | | | | | |
| ZnO | | | | | | | | | | | |
| NiO | | | | | | | | | | | |
| $Fe_2O_3$ | | | | | | | | | | | |
| $R_2O_3$ | | | | | | | | | | | |
| Young's modulus (GPa) | 132.2 | 122.4 | 129.1 | 129.3 | 135.2 | 134.2 | 135.4 | 132.1 | 133.9 | 135.0 | 135.1 |
| Transition temperature (° C.) | 797 | 768 | 767 | 812 | 780 | 786 | 774 | 775 | 792 | 778 | 779 |
| Surface roughness Ra (Å) | 4 | 4 | 4 | 4 | 4 | 4 | 3 | 4 | 4 | 4 | 4 |

TABLE 11

(molar %)

| Example | 164 | 165 | 166 | 167 | 168 | 169 | 170 | 171 | 172 | 173 |
|---|---|---|---|---|---|---|---|---|---|---|
| $SiO_2$ | 45.00 | 45.00 | 45.00 | 45.00 | 45.00 | 45.00 | 45.00 | 45.00 | 45.00 | 45.00 |
| $Al_2O_3$ | 17.50 | 17.50 | 17.50 | 17.50 | 17.50 | 17.50 | 17.50 | 17.50 | 17.50 | 17.50 |
| MgO | 22.50 | 22.50 | 22.50 | 22.50 | 22.50 | 22.50 | 22.50 | 22.50 | 22.50 | 22.50 |
| $Nd_2O_3$ | | | | | | | | | | 10.00 |
| $TiO_2$ | 5.00 | 5.00 | 5.00 | 5.00 | 5.00 | 5.00 | 5.00 | 5.00 | 5.00 | 5.00 |
| $Yb_2O_3$ | 10.00 | | | | | | | | | |
| $Tm_2O_3$ | | 10.00 | | | | | | | | |
| $Er_2O_3$ | | | 10.00 | | | | | | | |
| $Ho_2O_3$ | | | | 10.00 | | | | | | |
| $Dy_2O_3$ | | | | | 10.00 | | | | | |

TABLE 11-continued (molar %)

| Example | 164 | 165 | 166 | 167 | 168 | 169 | 170 | 171 | 172 | 173 |
|---|---|---|---|---|---|---|---|---|---|---|
| $Tb_2O_3$ | | | | | | 10.00 | | | | |
| $Gd_2O_3$ | | | | | | | 10.00 | | | |
| $Eu_2O_3$ | | | | | | | | 10.00 | | |
| $Sm_2O_3$ | | | | | | | | | 10.00 | |
| Young's modulus (GPa) | 128.4 | 128.0 | 127.7 | 127.4 | 126.0 | 125.3 | 125.2 | 123.2 | 122.4 | 120 |
| Transition temperature (° C.) | 784 | 781 | 788 | 781 | 781 | 776 | 778 | 772 | 774 | 769 |
| Surface roughness Ra (Å) | 4 | 4 | 4 | 4 | 4 | 4 | 4 | 4 | 4 | 4 |

TABLE 12

(molar %)

| Example | 174 | 175 | 176 | 177 | 178 | 179 | 180 | 181 | 182 | 183 | 184 | 185 | 186 |
|---|---|---|---|---|---|---|---|---|---|---|---|---|---|
| $SiO_2$ | 45.00 | 45.00 | 42.00 | 42.00 | 42.00 | 42.00 | 42.00 | 42.00 | 40.00 | 40.00 | 40.00 | 40.00 | 45.00 |
| $Al_2O_3$ | 17.50 | 17.50 | 17.50 | 17.50 | 17.50 | 17.50 | 17.50 | 17.50 | 17.50 | 17.50 | 17.50 | 17.50 | 10.00 |
| MgO | 22.50 | 22.50 | 17.50 | 12.50 | 17.50 | 12.50 | 17.50 | 12.50 | 19.50 | 20.50 | 22.50 | 17.50 | 20.00 |
| $Y_2O_3$ | | | 10.00 | 10.00 | 10.00 | 10.00 | 10.00 | 10.00 | 10.00 | 10.00 | 10.00 | 10.00 | 10.00 |
| $TiO_2$ | 5.00 | 5.00 | 8.00 | 8.00 | 8.00 | 8.00 | 8.00 | 8.00 | 10.00 | 7.00 | 5.00 | 10.00 | 10.00 |
| $ZrO_2$ | | | | | | | | | | 5.00 | 5.00 | 5.00 | |
| $Li_2O$ | | | | | | | | | | | | | 5.00 |
| CaO | | | 5.00 | 10.00 | | | | | | | | | |
| ZnO | | | | | | | 5.00 | 10.00 | | | | | |
| NiO | | | | | 5.00 | 10.00 | | | | | | | |
| $Fe_2O_3$ | | | | | | | | | | 5.00 | | | |
| $Pr_2O_3$ | 10.00 | | | | | | | | | | | | |
| $La_2O_3$ | | 10.00 | | | | | | | | | | | |
| Young's modulus (GPa) | 119.0 | 117.0 | 126.4 | 123.4 | 132.3 | 134.5 | 129.3 | 128.8 | 130.6 | 131.0 | 130.8 | 131.02 | 128.4 |
| Transition temperature (° C.) | 763 | 773 | 777 | 778 | 776 | 776 | 765 | 754 | 761 | 776 | 784 | 784 | 692 |
| Surface roughness Ra (Å) | 4 | 4 | 4 | 4 | 4 | 4 | 4 | 4 | 4 | 4 | 4 | 4 | 4 |

TABLE 13

(molar %)

| Example | 187 | 188 | 189 | 190 | Comparative 1 | Comparative 2 |
|---|---|---|---|---|---|---|
| $SiO_2$ | 45.00 | 45.00 | 45.00 | 45.00 | $SiO_2$: 73.00 | $SiO_2$: 52.00 |
| $Al_2O_3$ | 5.00 | 5.00 | 3.00 | 8.00 | $Al_2O_3$: 0.60 | $Al_2O_3$: 1.00 |
| MgO | 25.00 | 25.00 | 25.00 | 30.00 | CaO: 7.00 | CaO: 16.00 |
| $Y_2O_3$ | 10.00 | 10.00 | 10.00 | 2.50 | $Na_2O$: 9.00 | $Na_2O$: 7.00 |
| $TiO_2$ | 10.00 | 8.00 | 12.00 | 7.00 | $K_2O$: 9.00 | $K_2O$: 5.00 |
| $ZrO_2$ | | | | | ZnO: 2.00 | F: 19.00 |
| $Li_2O$ | 5.00 | 7.00 | 5.00 | 7.50 | $As_2O_3$: 0.20 | |
| CaO | | | | | | |
| ZnO | | | | | | |
| NiO | | | | | | |
| $Fe_2O_3$ | | | | | | |
| $Pr_2O_3$ | | | | | | |
| $La_2O_3$ | | | | | | |
| Young's modulus (GPa) | 131.5 | 131.1 | 132.5 | 119.1 | 79.0 | 91.0 |
| Transition temperature (° C.) | 687 | 664 | 687 | 652 | 554 | |
| Surface roughness Ra (Å) | 4 | 4 | 4 | 4 | 12.00 | 25 |

TABLE 14

| Example | 200 | 201 | 202 | 203 | 204 | 205 | 206 | 207 | 208 | 209 |
|---|---|---|---|---|---|---|---|---|---|---|
| (molar %) | | | | | | | | | | |
| $SiO_2$ | 40.00 | 40.00 | 40.00 | 40.00 | 35.00 | 45.00 | 44.00 | 45.00 | 40.00 | 43.00 |
| $Al_2O_3$ | 15.00 | 20.00 | 25.00 | 25.00 | 15.00 | 25.00 | 25.00 | 25.00 | 25.00 | 25.00 |
| MgO | 25.00 | 25.00 | 25.00 | 15.00 | 35.00 | 25.00 | 25.00 | 23.00 | 25.00 | 15.00 |
| CaO | 10.00 | 5.00 | | 10.00 | | | | | | 10.00 |
| $Y_2O_3$ | 5.00 | 5.00 | 5.00 | 5.00 | 5.00 | | 1.00 | 4.00 | 5.00 | |
| $TiO_2$ | 5.00 | 5.00 | 5.00 | 10.00 | 10.00 | 5.00 | 5.00 | | | 5.00 |
| $ZrO_2$ | | | | | | | | 2.00 | 5.00 | 2.00 |
| $Li_2O$ | | | | | | | | 2.00 | | |
| Surface roughness Ra (Å) | 4 | 4 | 4 | 4 | 5 | 4 | 4 | 4 | 5 | 4 |
| Specific gravity (g/cm³) | 3.14 | 3.1 | 3.063 | 3.06 | 3.225 | 2.81 | 2.833 | 2.970 | 3.152 | 2.841 |
| Young's modulus (GPa) | 119.4 | 121.7 | 124.3 | 118.3 | 128.6 | 113.4 | 117.0 | 126.5 | 126.4 | 112.0 |
| Specific elastic ($10^6$ Nm/kg) | 38.1 | 39.3 | 40.5 | 38.6 | 39.9 | 40.4 | 41.3 | 42.6 | 40.1 | 39.5 |

As seen from the results shown in Tables 1–14, the glasses of Examples 1–61, 100–190 and 200–209 have a high glass transition temperature and hence sufficiently high heat resistance enough to bear desired heat treatment (usually at a temperature of 700° C. or lower). In particular, they exhibits high glass strength characteristics such as Young's modulus and/or specific elastic modulus. Therefore, when they are used as substrates for magnetic recording media, they are not likely to exhibit warp or walking even when they are rotated at a high speed, and hence they can meet the demand of further thinner substrates. In addition, they can have so excellent flatness as to be polished to a surface roughness (Ra) of 5 Å or less, and therefore they can realize smaller flying height. Furthermore, the glasses of Examples 1–61 also exhibit reduced deflexion. Therefore, the glasses of the present invention are useful as glass substrates for magnetic recording media.

On the other hand, while the chemically tempered glass substrate of Comparative Example 1 is excellent in surface smoothness and flatness, it is substantially inferior to the glass substrates of the present invention in heat resistance and strength characteristics such as specific elastic modulus. Therefore, when it is used for producing magnetic recording media, it cannot be subjected to sufficient heat treatment for the magnetic layer to obtain high coercive force and hence magnetic recording media having high coercive force cannot be provided. Moreover, such a glass having a low specific elastic modulus of around $30 \times 10^6$ Nm/kg suffers severe warp and deflexion when it is made into substrates and therefore it cannot be used for thinner substrates.

The glass substrate of Comparative Example 2 is significantly inferior to the glasses of the present invention as to specific elastic modulus and surface smoothness. In particular, the surface smoothness of the substrate is degraded by relatively large crystal particles and hence higher recording density cannot be achieved.

The glasses of the present invention have high Young's modulus, high specific elastic modulus and high heat resistance, and therefore they are extremely useful as substrates for magnetic discs.

Method for producing hard disc

As shown in FIG. 1, a magnetic disc 1 comprises a glass substrate 2 made of the glass of the above Example 1, on which unevenness control layer 3, underlying layer 4, magnetic layer 5, protective layer 6 and lubricating layer 7 are provided in this order.

Each layer will be explained in detail. The substrate 1 was a disc having an outer circular periphery radius of 32.5 mm, inner circular periphery radius of 10.0 mm and thickness of 0.43 mm, whose main surfaces were subjected to precision polishing so that they should have surface roughness Ra of 4 Å and Rmax of 40 Å.

The unevenness control layer is a thin AlN layer of 5–35% nitrogen content having average roughness of 50 Å and surface roughness Rmax of 150 Å.

The underlying layer is a thin layer of CrV composed of Cr: 83 at % and V: 17 at % having a thickness of about 600 Å.

The magnetic layer is a thin layer of CoPtCr composed of Co: 76 at %, Pt: 6.6 at %, Cr: 17.4 at % having a thickness of about 300 Å.

The protective layer is a carbon thin layer having a thickness of about 100 Å.

The lubricating layer is a layer having a thickness of 8 Å, which was formed by applying perfluoropolyether on the carbon protective layer by spin coating.

The method for producing magnetic discs will be explained hereinafter.

The glass of Example 1 was cut into a disc having an outer circular periphery radius of 32.5 mm, inner circular periphery radius of 10.0 mm and thickness of 0.5 mm and the both main surfaces were subjected to precision polishing so that they should have surface roughness Ra of 4 Å and Rmax of 40 Å to afford a glass substrate for magnetic recording medium.

Subsequently, the above glass substrate was placed on a substrate holder and transferred into a charging chamber of inline sputtering apparatus. Then, the holder on which the glass substrate was placed was transferred to a first chamber where an Al target was etched and sputtering was performed at a pressure of 4 mtorr and substrate temperature of 350° C. in an atmosphere of $Ar+N_2$ gas ($N_2$=4%). As a result, an AlN thin layer having surface roughness Rmax of 150 Å and thickness of 50 Å (unevenness forming layer) was provided on the glass substrate.

The holder on which the glass substrate having the formed AlN layer was placed was then transferred into a second chamber provided with a CrV target (Cr: 83 at %, V: 17 at %) and second chamber provided with a CoPtCr target (Co: 76 at %, Pt: 6.6 at %, Cr: 17.4 at %) successively, and thin layers were formed on the substrate. Sputtering was performed at a pressure of 2 mtorr and substrate temperature of 350° C. in an Ar atmosphere, thereby a CrV underlying layer having a thickness of about 600 Å and CoPtCr magnetic layer having a thickness of about 300 Å were formed.

The substrate having the formed unevenness control layer, underlying layer and magnetic layer was then transferred to a fourth chamber provided with a heater for heat treatment. The fourth chamber had an inner atmosphere of Ar gas ((pressure: 2 mtorr) and the heat treatment was performed.

The substrate was then transferred into a fifth chamber provided with a carbon target, and a carbon protective layer having a thickness of about 100 Å was formed under the same condition as used for forming of the CrV underlying layer and the CoPtCr magnetic layer except that the layer was formed in an atmosphere of $Ar+H_2$ gas ($H_2=6\%$).

Finally, the substrate after forming the carbon protective layer was taken out from the above inline sputtering apparatus, and a lubricating layer having a thickness of 8 Å was formed by applying perfluoropolyether on the carbon protective layer by dipping.

The present invention was explained by referring to the preferred examples, but the present invention is not limited to the above examples.

By using glass of the present invention, a glass substrate having high specific elastic modulus of $36 \times 10^6$ Nm/kg or more or high Young's modulus of 110 GPa or more, high transition temperature of 700° C. or higher (high heat resistance), excellent surface smoothness (surface roughness Ra<5 Å) and high strength can be provided. Because the glass of the present invention has excellent heat resistance, it can be subjected to heat treatment necessary for improving magnetic layer characteristics without causing deformation of substrates made from it. Therefore, it can have excellent flatness and hence achieve smaller flying height of magnetic head, i.e., higher recording density. Moreover, it exhibits high specific elastic modulus and high strength, it can realize thinner magnetic discs and prevent breakdown of magnetic discs. Furthermore, it can be stably obtained as glass and easily produced in an industrial scale. Therefore, it can be surely expected to be used as economical glass for substrates of next generation magnetic recording media.

What is claimed is:

1. Disc substrates for information recording discs, wherein said substrates consist of glass having a specific elastic modulus G of $36 \times 10^6$ Nm/kg or more.

2. The disc substrates of claim 1 whose surface roughness (Ra) can be made 5 Å or less.

3. The disc substrates of claim 1, which has a transition temperature of 700° C. or higher.

4. A magnetic disc comprising the substrate of claim 7 and at least one of magnetic layer thereon.

5. A magnetic disc comprising the substrate of claim 1 and at least one of magnetic layer thereon.

6. A method for recording or reproducing of information in a magnetic layer of a magnetic disc using a flying magnetic head, wherein said magnetic disc is that of claim 5.

7. Disc substrates for information recording discs, wherein said substrates consist of glass exhibiting a Young's modulus of 90 GPa or more.

8. The disc substrates of claim 7 whose surface roughness (Ra) can be made 5 Å or less.

9. The disc substrates of claim 7, wherein said glass having a transition temperature of 700° C. or higher.

10. The disc substrates of claim 7, which are those for substrates of magnetic discs.

11. The disc substrates of claim 1, which are those for substrates of magnetic discs.

12. A method for recording or reproducing of information in a magnetic layer of a magnetic disc using a flying magnetic head, wherein said magnetic disc is that of claim 11.

13. The disc substrates of claim 7, wherein said glass has Young's modulus of 110 GPa or more.

14. Disc substrates for information recording discs, wherein said substrates consist of glass comprising, as oxides constituting the glass, $SiO_2$: 25–52%, $Al_2O_3$: 5–35%, MgO: 15–45%, $Y_2O_3$: 0–17%, $TiO_2$: 0–25%, $ZrO_2$: 0–8%, CaO: 1–30%, $B_2O_3+P_2O_5$: 0–5%, provided that $Y_2O_3+TiO_2+ZrO_2+CaO$: 5–30%, in molar %, and having a specific elastic modulus of $36 \times 10^6$ Nm/kg or more.

15. The disc substrates of claim 14 further comprising $As_2O_3+Sb_2O_3$: 0–3% and $Zno+Sro+NiO+CoO+FeO+CuO+Cr_2O_3+Fe_2O_3+B_2O_3+P_2O_5+V_2O_5$: 0–5%.

16. A magnetic disc comprising the substrate of claim 14 and at least one of magnetic layer thereon.

17. A method for recording or reproducing of information in a magnetic layer of a magnetic disc using a flying magnetic head, wherein said magnetic disc is that of claim 16.

18. Disc substrates for information recording discs, wherein said substrates consist of glass comprising, as oxides constituting the glass, $SiO_2$: at least 25%, $Al_2O_3$ 0% to 37%, MgO: 0% to 40%, $TiO_2$: 0% to 25%, in molar %, and having a specific elastic modulus of $36 \times 10^6$ Nm/kg or more.

19. The disc substrates of claim 18 wherein said glass further comprises $Y_2O_3$: 0–17%, $ZrO_2$: 0–8%, CaO: 0–25%, $As_2O_3+Sb_2O_3$: 0–3% and $ZnO+SrO+Nio+CoO+FeO+CuO+Fe_2O_3+Cr_2O_3+B_2O_3+P_2O_5+V_2O_5$: 0–5%.

20. A magnetic disc comprising the substrate of claim 18 and at one of magnetic layer thereon.

21. A method for recording or reproducing of information in a magnetic layer of a magnetic disc using a flying magnetic head, wherein said magnetic disc is that of claim 20.

22. The disc substrates of claim 18 wherein said glass further comprises an alkaline substance.

23. A magnetic disc comprising the substrate of claim 22 and at least one of magnetic layer thereon.

24. A method for recording or reproducing of information in a magnetic layer of a magnetic disc using a flying magnetic head, wherein said magnetic disc is that of claim 23.

25. The disc substrates of claim 18, wherein said glass contains $SiO_2$: 25–50%, $Al_2O_3$: 10–37%, MgO: 5–40%, $TiO_2$: 1–25%, in molar %.

26. Disc substrates for information recording discs, wherein said substrates consist of glass comprising, as oxides constituting the glass, $SiO_2$: at least 25%, $Al_2O_3$: 0% to 40%, CaO: 0% to 30%, $Y_2O_3$: 0% to 15%, in molar %, and having a specific elastic modulus of $36 \times 10^6$ NM/kg or more.

27. The disc substrates of claim 26 wherein said glass contains $SiO_2$: 25–50%, $Al_2O_3$: 20–40%, CaO: 8–30%, $Y_2O_3$: 2–15%, in molar %.

28. The disc substrates of claim 26, wherein said glass further comprises MgO: 0–20 %, $TiO_2$: 0–25%, $Li_2O$: 0–12%, $As_2O_3+Sb_2O_3$: 0–3% and $ZnO+SrO+NiO+CoO+FeO+CuO+Fe_2O_3+Cr_2O_3+B_2O_3+P_2O_5+V_2O_5$: 0–5%.

29. The disc substrates of claim 26, wherein the glass exhibits a Young's modulus of 90 GPa or more.

30. A magnetic disc comprising the substrate of claim 26 and at least one of magnetic layer thereon.

31. A method for recording or reproducing of information in a magnetic layer of a magnetic disc using a flying magnetic head, wherein said magnetic disc is that of claim 30.

32. Disc substrates for information recording discs, wherein said substrates consist of glass comprising, as oxides constituting the glass, $SiO_2$: at least 30%, $Al_2O_3$; 0% to 35%, MgO: 0.40%, $Li_2O$: 0–20%, $Y_2O_3$, 0–27%, $La_2O_3$: 0–27%, $CeO_2$: 0–27%, $Pr_2O_3$: 0–27%, $Nd_2O_3$: 0–27%, $SM_2O_3$: 0–27%, $Eu_2O_3$: 0–27%, $Gd_2O_3$: 0–27%, $Tb_2O_3$: 0–27, $Dy_2O_3$: 0–27%, $HO_2O_3$: 0–27%, $Er_2O_3$, 0–27%, $TM_2O_3$: 0–27%, $Yb_2O_3$: 0–27%, provided that $Y_2O_3+La_2O_3+CeO_2+Pr_2O_3+Nd_2O_3+SM_2O_3+Eu_2O_3+Gd_2O_3+Tb_2O_3+Dy_2O_3+Ho_2O_3+Er_2O_3+Tm_2O_3+Yb_2O_3$, 1–27% and $Li_2O+MgO+Y_2O_3+La_2O_3+CeO_2+Pr_2O_3++Nd_2O_3+Sm_2O_3+Eu_2O_3+Gd_2O_3+Tb_2O_3+Dy_2O_3+Ho_2O_3+Er_2O_3+Tm_2O_3+Yb_2O_3>15\%$, in molar %, and having a Young's modulus of 90 GPa or more.

33. The disc substrates of claim 32, wherein said glass further comprises $TiO_2$:0–20%, $ZrO_2$: 0–8%, CaO: 0–15%, ZnO: 0–15%, NiO: 0–15% and $Fe_2O_3$: 0–15%, provided that $TiO_2+ZrO_2$: 0–20% and $CaO+ZnO+NiO+Fe_2O_3$: 0–15%.

34. The disc substrates of claim 33 wherein said glass further comprises $Na_2O$, $K_2O$ or both.

35. The disc substrates of claim 32 further containing $AS_2O_3+Sb_2O_3$: 0–2%, $B_2O_3+P_2O_5+Nb_2O_5+V_2O_5+Cr_2O_3+Ga_2O_3+CoO+SrO+BaO+SrO+FeO+CuO+MnO+Na_2O+K_2O$: 0–8.

36. The disc substrates of claim 32, wherein the glass exhibits a specific elastic modulus G of $36\times10^6$ Nm/kg or more.

37. A magnetic disc comprising the substrate of claim 32 and at least one of magnetic layer thereon.

38. A method for recording or reproducing of information in a magnetic layer of a magnetic disc using a flying magnetic head, wherein said magnetic disc is that of claim 37.

39. The disc substrates of claim 32, wherein said glass has Young's modulus of 110 GPa or more.

40. The disc substrates of claim 39, wherein said glass further contains $TiO_2$: 0–20%, $ZrO_2$: 0–8%, CaO: 0–15%, ZnO: 0–15%, NiO: 0–15% and $Fe_2O_3$: 0–15%, provided that $TiO_2+ZrO_2$: 0–20% and $CaO+ZnO+NiO+Fe_2O_3$: 0–15%.

41. The disc substrates of claim 40 wherein said glass further comprises $Na_2O$, $K_2O$ or both.

42. The disc substrates of claim 32 wherein said glass further comprises $Na_2O$, $K_2O$ or both.

43. Disc substrates for information recording discs, wherein said substrates are composed of $SiO_2$—$Al_2O_3$—RO glass (R is a bivalent metal) and said glass comprises 20 molar % or more of $Al_2O_3$.

44. The disc substrates of claim 43, wherein the glass comprises at least one of $TiO_2$ and $ZrO_2$.

45. Disc substrates for information recording discs, wherein said substrates are composed of $SiO_2$—$Al_2O_3$—RO glass (R is a bivalent metal) and said glass comprises MgO and CaO.

46. The disc substrates of claim 45, wherein the glass comprises at least one of $TiO_2$ and $ZrO_2$.

47. A magnetic disc comprising the substrate of claim 45 and at least one of magnetic layer thereon.

48. A method for recording or reproducing of information in a magnetic layer of a magnetic disc using a flying magnetic head, wherein said magnetic disc is that of claim 47.

49. The disc substrates of claim 45 wherein said glass comprises 20 molar % or more of MgO.

50. Disc substrates for information recording discs wherein said substrates are composed of $SiO_2$—$Al_2O_3$—Ro glass R is a bivalent metal) and said glass further comprises $Y_2O_3$.

51. The disc substrates of claim 50, wherein the glass comprises 0.5–17 molar % of $Y_2O_3$.

52. The disc substrates of claim 50, wherein the glass comprises at least one of $TiO_2$ and $ZrO_2$.

53. A magnetic disc comprising the substrate of claim 50 and at least one of magnetic layer thereon.

54. A method for recording or reproducing of information in a magnetic layer of a magnetic disc using a flying magnetic head, wherein said magnetic disc is that of claim 53.

55. Disc substrates for information recording discs, wherein said substrates consist of glass mainly comprising $SiO_2$ as a network forming component and further comprising one or more oxide of metal selected from the group consisting of Ti, V, Cr, Mn, Fe, Co, Ni, Cu, Zn, Ga, Ge, Y, Zr, Nb, Mo, La, Ce, Pr, Nd, Pm, Sm, Eu, Gd, Tb, Dy, Ho, Er, Tm, Yb, Hf, Ta and W as Young's modulus modifiers, the total content thereof being in a range of 3–30 molar %.

56. The disc substrates of claim 55 wherein the glass has a composition of $SiO_2$: 30–60%, $Al_2O_3$: 0–35%, MgO: 0–40%, CaO: 0–15%, $Li_2O$: 0–20%, $TiO_2$: 0–20%, $V_2O_5$: 0–8%, $Cr_2O_3$: 0–8%, MnO:0–8%, $Fe_2O_3$: 0–15%, CoO:0–8%, NiO: 0–15%, CuO:0–8%, ZnO: 0–15%, $Ga_2O_3$: 0–8%, GeO: 0–8, $Y_2O_3$: 0–27%, $ZrO_2$: 0–8%, $Nb_2O_5$: 0–8%, $Mo_2O_3$: 0–8, $La_2O_3$: 0–27%, $CeO_2$: 0–27%, $Pr_2O_3$: 0–27%, $Nd_2O_3$: 0–27%, $Pm_2O_3$: 0–27, $Sm_2O_3$: 0–27%, $Eu_2O_3$: 0–27%, $Gd_2O_3$: 0–27%, $Tb_2O_3$: 0–27%, $Dy_2O_3$: 0–27%, $Ho_2O_3$: 0–27%, $Er_2O_3$: 0–27%, $Tm_2O_3$: 0–27%, $Yb_2O_3$: 0–27%, $HfO_2$: 0–8, $Ta_2O_5$: 0–8, WO: 0–8, provided that $TiO_2+V_2O_5+Cr_2O_3+MnO+Fe_2O_3+CoO+NiO+CuO+ZnO+Ga_2O_3+GeO+Y_2O_3+ZrO_2+Nb_2O_5+MO_2O_3+La_2O_3+CeO_2+Pr_2O_3+Nd_2O_3+Sm_2O_3+Eu_2O_3+Gd_2O_3+Tb_2O_3+Dy_2O_3+Ho_2O_3+Er_2O_3+Tm_2O_3+Yb_2O_3$: 3–30% and $Li_2O+MgO+Y_2O_3+La_2O_3+CeO_2+Pr_2O_3+Nd_2O_3+Sm_2O_3+EU_2O_3+Gd_2O_3+Tb_2O_3+Dy_2O_3+Ho_2O_3+Er_2O_3+Tm_2O_3+Yb_2O_3>15\%$, in molar.

57. The disc substrates of claim 55 wherein the glass comprises $Li_2O$ in a range of 2–20 molar %.

58. A magnetic disc comprising the substrate of claim 57 and at least one of magnetic layer thereon.

59. The disc substrates of claim 57 wherein the glass has been chemically tempered by being subjected to ion-exchange of Li ions with Na ions.

60. A magnetic disc comprising the substrate of claim 55 and at least one of magnetic layer thereon.

61. A method for recording or reproducing of information in a magnetic layer of a magnetic disc using a flying magnetic head, wherein said magnetic disc is that of claim 60.

62. A method for recording or reproducing of information in a magnetic layer of a magnetic disc using a flying magnetic head, wherein said magnetic disc is that of claim 55.

63. Disc substrates for information recording discs, wherein the substrates consist of glass comprising, as oxides constituting the glass, $SiO_2$: at least 30%, $Al_2O_3$— 0% to 35%, MgO: more than 0, equal to or than 40%, CaO: 0–15%, $TiO_2$: 2–20%, $Y_2O_3$: 1–27%, $ZrO_2$ 0–8% in molar %, and further containing an alkali metal oxide.

64. The disc substrates of claim 63 wherein the glass comprises $Li_2O$ in a range of 2–20 molar %.

65. A magnetic disc comprising the substrate of claim 67 and at least one of magnetic layer thereon.

66. A method for recording or reproducing of information in a magnetic layer of a magnetic disc using a flying magnetic head, wherein said magnetic disc is that of claim 65.

67. The disc substrates of claim 63 wherein the glass comprises $Li_2O$ and $Na_2O$.

68. A magnetic disc comprising the substrate of claim 67 and at least one of magnetic layer thereon.

69. A method for recording or reproducing of information in a magnetic layer of a magnetic disc using a flying magnetic head, wherein said magnetic disc is that of claim 68.

70. A method for recording or reproducing of information in a magnetic layer of a magnetic disc using a flying magnetic head, wherein said magnetic disc is that of claim 64.

71. Disc substrates for information recording discs, wherein the substrates consist of glass comprising, as oxides constituting the glass, $SiO_2$: 30–60%, $Al_2O_3$: 2–35%, MgO: 0–40%, CaO: 0–15%, $Y_2O_3$: 1–27%, $ZrO_2$: 0–8%, in molar %, and containing an alkali metal oxide, and wherein the glass substantially does not contain $TiO_2$.

72. The disc substrates of claim 71 wherein the glass comprises $Li_2O$ in a range of 2–20 molar %.

73. Disc substrates for information recording discs, wherein the substrates consist of glass comprising, as oxides constituting the glass, $SiO_2$—: 30–60%, $Al_2O_3$: 15–35%, MgO: 0–40%, CaO: 0–15%, $TiO_2$: 2–20%, $Y_2O_3$: 1–27%, $ZrO_2$: 0–8% in molar % and containing an alkali metal oxide.

74. The disc substrates of claim 73 wherein the glass comprises $Li_2O$ in a range of 2–20 molar %.

75. Disc substrates for information recording discs, wherein the substrates consist of glass comprising, as oxides constituting the glass, $SiO_2$: 30–60%, $Al_2O_3$: 2–35%, MgO: 0–40%, CaO: 0–15%, $TiO_2$; 2–20%, $Y_2O_3$; 1–27%, $ZrO_2$: 0–8% in molar %, and wherein the glass substantially does not contain alkali metal oxides.

* * * * *